United States Patent
Huang et al.

(10) Patent No.: US 12,082,204 B2
(45) Date of Patent: Sep. 3, 2024

(54) FEEDBACK TRANSMISSIONS BASED ON UPLINK GRANTS

(71) Applicant: QUALCOMM Incorporated, San Diego, CA (US)

(72) Inventors: Yi Huang, San Diego, CA (US); Wei Yang, San Diego, CA (US); Wanshi Chen, San Diego, CA (US); Peter Gaal, San Diego, CA (US); Seyedkianoush Hosseini, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/146,373

(22) Filed: Jan. 11, 2021

(65) Prior Publication Data

US 2021/0219331 A1    Jul. 15, 2021

Related U.S. Application Data

(60) Provisional application No. 62/961,570, filed on Jan. 15, 2020.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0003* (2013.01); *H04W 72/1268* (2013.01); *H04W 72/1273* (2013.01)

(58) Field of Classification Search
None
See application file for complete search history.

(56) References Cited

U.S. PATENT DOCUMENTS 11,496,247 B2 * 11/2022 Liu .................. H04L 5/0094
2015/0131494 A1 * 5/2015 He .................. H04W 36/0085
370/280
(Continued)

FOREIGN PATENT DOCUMENTS

CN          104521304 A    4/2015
WO    WO-2019134083 A1    7/2019

OTHER PUBLICATIONS

MCC Support, Final Report of 3GPP TSG RAN WG1 #AH_NR3 v1.0.0 (Nagoya, Japan, Sep. 18-21, 2017), R1-1716942, Section 6.3.2.3, "UCI multiplexing" (Year: 2017).*
(Continued)

*Primary Examiner* — Liem H. Nguyen
(74) *Attorney, Agent, or Firm* — Kevin M. Donnelly; Holland & Hart LLP

(57) ABSTRACT

Methods, systems, and devices for wireless communications are described. A base station may identify and schedule a set of bits in the physical uplink shared channel (PUSCH) for transmission of feedback for downlink transmissions occurring after transmission of the uplink grant scheduling the PUSCH. After receiving the uplink grant, a user equipment (UE) may receive control channel (PDCCH) transmissions that schedule downlink transmissions. The UE may monitor for and generate feedback for the downlink transmission. The UE may then utilize the bits indicated by the UL grant to transmit the feedback. In some examples, the UE may determine whether the indicated bits are adequate to transmit the feedback for the later downlink transmissions. When the UE determines that the extra bits are not adequate (e.g., there are not enough bits), then the UE may determine to transmit the feedback separate from the PUSCH resources scheduled by the uplink grant.

64 Claims, 14 Drawing Sheets

(51) Int. Cl.
*H04W 72/1268* (2023.01)
*H04W 72/1273* (2023.01)

(56) References Cited

U.S. PATENT DOCUMENTS

| | | | | |
|---|---|---|---|---|
| 2016/0205679 | A1* | 7/2016 | Yoo | H04L 5/001 370/329 |
| 2018/0006791 | A1* | 1/2018 | Marinier | H04L 1/0073 |
| 2019/0069321 | A1 | 2/2019 | Akkarakaran et al. | |
| 2019/0081737 | A1 | 3/2019 | Huang et al. | |
| 2019/0132861 | A1 | 5/2019 | Koorapaty et al. | |
| 2019/0335488 | A1* | 10/2019 | Xiong | H04L 5/0046 |
| 2020/0196333 | A1 | 6/2020 | Lin | |
| 2020/0213952 | A1 | 7/2020 | Wang et al. | |
| 2020/0235866 | A1* | 7/2020 | Liu | H04L 5/0055 |
| 2020/0275432 | A1* | 8/2020 | Li | H04L 1/1812 |
| 2020/0275476 | A1* | 8/2020 | Yang | H04B 7/0482 |
| 2020/0296715 | A1* | 9/2020 | Wang | H04L 1/1819 |
| 2021/0050950 | A1* | 2/2021 | Zhou | H04W 76/14 |
| 2021/0092763 | A1* | 3/2021 | Li | H04W 72/21 |
| 2021/0144702 | A1* | 5/2021 | Zhao | H04L 5/0044 |
| 2021/0219326 | A1* | 7/2021 | Takeda | H04W 72/1263 |
| 2021/0274497 | A1* | 9/2021 | Fu | H04L 5/0055 |
| 2021/0329683 | A1* | 10/2021 | Yang | H04W 72/23 |
| 2022/0322326 | A1* | 10/2022 | Wong | H04W 72/0446 |

OTHER PUBLICATIONS

CATT, Multiplexing of UCI and UL data on PUSCH, 3GPP TSG RAN WG1 Meeting AH_#NR3, Nagoya, Japan, Sep. 18-21, 2017, R1- 1715822, Section 2 (Year: 2017).*
U.S. Appl. No. 62/961,570, filed Jan. 15, 2020.
CATT: "Multiplexing of UCI and UL Data on PUSCH", 3GPP Draft, 3GPP TSG RAN WG1 Meeting AH_#NR3, R1-1715822, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339282, 3 Pages, Retrieved from the Internet: URL: http://www.3gpp.org/ftp/Meetings_3GPP_SYNC/RAN1/Docs/. [Retrieved on Sep. 17, 2017] p. 2. list item 1. Option 1.
International Search Report and Written Opinion—PCT/US2021/013064—ISA/EPO—dated Jul. 28, 2021.
Mediatek Inc: "Multiple HARQ Procedures and Intra-UE UCI Prioritization", 3GPP Draft, 3GPP TSG RAN WG1 Meeting #98, R1-1908409, Multiple HARQ Procedures and Intra-UE UCI Prioritization, 3rd Generation Partnership Project (3GPP), Mobile Competence Centre, 650, Route Des Lucioles, F-06921 Sophia-Antipolis , vol. RAN WG1, No. Prague, Czech, Aug. 26, 2019-Aug. 30, 2019, Aug. 17, 2019 (Aug. 17, 2019), XP051765018, 15 Pages, Retrieved from the Internet: URL: http://www.3gpp.org/ftp/tsg_ran/WG1_RL1/TSGR1_98/Docs/R1-1908409.zip. [retrieved] F75on Aug. 17, 2019] p. 1. Introduction.
Sony: "UCI Enhancements for URLLC", 3GPP Draft, R1-1910769, 3GPP TSG RAN WG1 #98bis, REL-16 EURLLC—UCI V03, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 7, 2019 (Oct. 7, 2019), XP051808970, 10 Pages, Retrieved from the Internet: URL: https://ftp.3gpp.org/tsg_ran/WG1_RL1/TSGR1_98b/Docs/R1-1910769.zip.R1-1910769—Rel-16eURLLC—UCI v03.docx. [Retrieved on Oct. 7, 2019]. p. 10. Proposal 10.
Lenovo: et al., "Remaining Issues on CBG-Based (re) Transmission", 3GPP Draft, 3GPP TSG RAN WG1 Meeting NR#3, R1-1715533, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339000, 5 Pages, Retrieved from the Internet: URL: http://www.3gpp.org/ftp/Meetings_3GPP_SYNC/RAN1/Docs/. [retrieved on Sep. 17, 2017] p. 5, par. 1.
Partial International Search Report—PCT/US2021/013064—ISA/EPO—dated Apr. 28, 2021.
Qualcomm Incorporated: "Summary of Remaining Issues for UCI Multiplexing on PUSCH", 3GPP Draft, 3GPP TSG RAN WG1 Meeting NR#3, R1-1716853, Summary of Remaining Issues for UCI Multiplexing on PUSCH, 3rd Generation Partnership Project (3GPP), Mobile Competence Centre, 650, Route Des Lucioles, F-06921 Sophia-Antipol, vol. RAN WG1, No. Nagoya, Japan, Sep. 18, 2017-Sep. 21, 2017, Sep. 20, 2017 (Sep. 20, 2017), XP051353899, 3 Pages, Retrieved from the Internet: URL: http://www.3gpp.org/ftp/tsg_ran/WG1_RL1/TSGR1_AH/NR_AH_1709/Docs/. [retrieved on-Sep. 20, 2017] p. 2, section 2.1, p. 3, up to and excluding . . . Proposal 411.
VIVO: "UCI Enhancements for URLLC", 3GPP Draft, 3GPP TSG RAN WG1 #98, R1-1908159, UCI Enhancements for URLLC, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051764778, 12 Pages, Retrieved from the Internet: URL: http://www.3gpp.org/ftp/tsg_ran/WG1_RL1/TSGR1_98/Docs/R1-1908159.zip. [retrieved on Aug. 17, 2019] p. 11, Scenario 14, Option 2.
LTE Notes: "LTE Downlink Assignment Index (DAI)", Simplified notes on 3GPP/LTE, Jul. 7, 2015, 5 Pages.

* cited by examiner

FEEDBACK TRANSMISSIONS BASED ON UPLINK GRANTS

CROSS REFERENCE

The present Application for Patent claims the benefit of U.S. Provisional Patent Application No. 62/961,570 by HUANG et al., entitled "FEEDBACK TRANSMISSIONS BASED ON UPLINK GRANTS," filed Jan. 15, 2020, assigned to the assignee hereof, and expressly incorporated by reference herein.

FIELD OF TECHNOLOGY

The following relates generally to wireless communications and more specifically to feedback transmissions based on uplink grants.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may communicate one or more control messages to grant or schedule resources for subsequent transmissions, such as data transmissions.

SUMMARY

The described techniques relate to improved methods, systems, devices, and apparatuses that support feedback transmissions based on uplink grants. A base station may identify and schedule a set of bits in the physical uplink shared channel (PUSCH) which may be used for transmission of feedback for downlink shared channel transmissions which may occur after transmission of an uplink grant scheduling the PUSCH. After receiving the uplink grant, for example, a user equipment (UE) may receive control channel (e.g., a physical downlink control channel (PDCCH)) transmissions that may schedule one or more downlink transmissions. The UE may monitor for and generate feedback for the one or more downlink transmissions. The UE may then utilize the bits indicated by the uplink (UL) grant to transmit the feedback. In some examples, the UE may determine whether the indicated bits are adequate to transmit the feedback for the later downlink transmissions. When the UE determines that the indicated bits are not adequate (e.g., there are not enough bits), then the UE may determine to transmit the feedback via a resource separate from the PUSCH resources scheduled by the uplink grant and transmit the feedback.

A method of wireless communications at a UE is described. The method may include receiving an uplink grant indicating scheduling information for an uplink shared channel transmission for the UE and indicating a number of bits for feedback for one or more downlink shared channel transmissions received after the uplink grant, receiving, after receiving the uplink grant, a downlink grant indicating scheduling information for a downlink shared channel transmission, monitoring for the downlink shared channel transmission based on the scheduling information for the downlink shared channel transmission, generating feedback associated with the downlink shared channel transmission based on monitoring for the downlink shared channel transmission, and transmitting the generated feedback based on the number of bits for feedback indicated by the uplink grant.

An apparatus for wireless communications at a UE is described. The apparatus may include a processor, memory coupled with the processor, and instructions stored in the memory. The instructions may be executable by the processor to cause the apparatus to receive an uplink grant indicating scheduling information for an uplink shared channel transmission for the UE and indicating a number of bits for feedback for one or more downlink shared channel transmissions received after the uplink grant, receive, after receiving the uplink grant, a downlink grant indicating scheduling information for a downlink shared channel transmission, monitor for the downlink shared channel transmission based on the scheduling information for the downlink shared channel transmission, generate feedback associated with the downlink shared channel transmission based on monitoring for the downlink shared channel transmission, and transmit the generated feedback based on the number of bits for feedback indicated by the uplink grant.

Another apparatus for wireless communications at a UE is described. The apparatus may include means for receiving an uplink grant indicating scheduling information for an uplink shared channel transmission for the UE and indicating a number of bits for feedback for one or more downlink shared channel transmissions received after the uplink grant, receiving, after receiving the uplink grant, a downlink grant indicating scheduling information for a downlink shared channel transmission, monitoring for the downlink shared channel transmission based on the scheduling information for the downlink shared channel transmission, generating feedback associated with the downlink shared channel transmission based on monitoring for the downlink shared channel transmission, and transmitting the generated feedback based on the number of bits for feedback indicated by the uplink grant.

A non-transitory computer-readable medium storing code for wireless communications at a UE is described. The code may include instructions executable by a processor to receive an uplink grant indicating scheduling information for an uplink shared channel transmission for the UE and indicating a number of bits for feedback for one or more downlink shared channel transmissions received after the uplink grant, receive, after receiving the uplink grant, a downlink grant indicating scheduling information for a downlink shared channel transmission, monitor for the downlink shared channel transmission based on the scheduling information for the downlink shared channel transmission, generate feedback associated with the downlink shared channel transmission based on monitoring for the downlink shared channel transmission, and transmit the generated feedback based on the number of bits for feedback indicated by the uplink grant.

The method, apparatuses, and non-transitory computer-readable medium described herein, receiving the uplink grant indicating the number of bits for feedback may include operations, features, means, or instructions for receiving a predicted number of bits for feedback.

The method, apparatuses, and non-transitory computer-readable medium described herein may further include operations, features, means, or instructions for identifying a number of bits for transmitting the generated feedback for the downlink shared channel transmission, where the generated feedback may be transmitted based on the identified number of bits.

The method, apparatuses, and non-transitory computer-readable medium described herein may further include operations, features, means, or instructions for determining that the number of bits for transmitting the generated feedback may be less than or equal to the number of bits indicated by the uplink grant, where the generated feedback may be transmitted based on the determining.

The method, apparatuses, and non-transitory computer-readable medium described herein may further include operations, features, means, or instructions for inserting one or more values in the generated feedback such that the number of bits for transmitting the generated feedback may be equal to the number of bits indicated by the uplink grant based on determining that the number of bits for transmitting the generated feedback is less than the number of bits indicated by the uplink grant, where the generated feedback including the one or more values may be transmitted based on the inserting.

The method, apparatuses, and non-transitory computer-readable medium described herein, the generated feedback may be multiplexed with the uplink shared channel transmission based on the scheduling information indicated by the uplink grant.

The method, apparatuses, and non-transitory computer-readable medium described herein may further include operations, features, means, or instructions for determining that the number of bits for transmitting the generated feedback may be greater than the number of bits indicated by the uplink grant, where the generated feedback may be transmitted based on the determining.

The method, apparatuses, and non-transitory computer-readable medium described herein may further include operations, features, means, or instructions for determining to transmit the generated feedback separate from the uplink shared channel transmission based on determining that the number of bits for transmitting the generated feedback may be greater than the number of bits indicated by the uplink grant, where the generated feedback may be transmitted separate from the uplink shared channel transmission.

The method, apparatuses, and non-transitory computer-readable medium described herein may further include operations, features, means, or instructions for identifying a multiplexing flag in the downlink grant, where the generated feedback may be transmitted based on a value of the multiplexing flag.

The method, apparatuses, and non-transitory computer-readable medium described herein may further include operations, features, means, or instructions for multiplexing the generated feedback with the uplink shared channel transmission based on the value of the multiplexing flag.

The method, apparatuses, and non-transitory computer-readable medium described herein may further include operations, features, means, or instructions for determining to transmit the generated feedback separate from the uplink shared channel transmission based on the value of the multiplexing flag, where the generated feedback may be transmitted separate from the uplink shared channel transmission.

The method, apparatuses, and non-transitory computer-readable medium described herein may further include operations, features, means, or instructions for receiving, after receiving the uplink grant, a second downlink grant including the multiplexing flag, where the generated feedback may be transmitted based on the value of the multiplexing flag of a later downlink grant of the downlink grant and the second downlink grant.

The method, apparatuses, and non-transitory computer-readable medium described herein may further include operations, features, means, or instructions for determining whether to transmit the generated feedback in the uplink shared channel transmission or to transmit the generated feedback separate from the uplink shared channel transmission based on a modulation and coding scheme corresponding to a physical uplink shared channel scheduled by the uplink grant, a number of feedback bits indicated by the downlink grant, an amount of resources corresponding to the physical uplink shared channel, or any combination thereof, where the feedback may be transmitted based on the determining.

The method, apparatuses, and non-transitory computer-readable medium described herein may further include operations, features, means, or instructions for identifying whether a ratio of the number of feedback bits to the amount of resources corresponding to the physical uplink shared channel may be greater than a threshold, where the generated feedback may be transmitted in the uplink shared channel transmission or separate from the uplink shared channel transmission based on the ratio.

In the method, apparatuses, and non-transitory computer-readable medium described herein, the uplink grant indicates the number of bits using a field that also indicates a feedback codebook size corresponding to at least one downlink transmission transmitted before the uplink grant.

In the method, apparatuses, and non-transitory computer-readable medium described herein, the uplink grant indicates the number of bits using a first field, and where the uplink grant includes a second field that indicates a feedback codebook size corresponding to at least one downlink transmission transmitted before the uplink grant.

In the method, apparatuses, and non-transitory computer-readable medium described herein, the generated feedback may include one or more values that indicate a decoding status corresponding to the downlink shared channel transmission.

A method of wireless communications at a base station is described. The method may include determining scheduling information for an uplink shared channel transmission for a user equipment and a number of bits for feedback for one or more downlink shared channel transmissions transmitted to a UE after an uplink grant, transmitting the uplink grant indicating the scheduling information for the uplink shared channel transmission and the number of bits, transmitting, after transmitting the uplink grant, a downlink grant indicating scheduling information for a downlink shared channel transmission of the UE, and monitoring for feedback for the downlink shared channel transmission based on the number of bits for feedback indicated by the uplink grant.

An apparatus for wireless communications at a base station is described. The apparatus may include a processor, memory coupled with the processor, and instructions stored in the memory. The instructions may be executable by the processor to cause the apparatus to determine scheduling information for an uplink shared channel transmission for a user equipment and a number of bits for feedback for one or more downlink shared channel transmissions transmitted to a UE after an uplink grant, transmit the uplink grant indicating the scheduling information for the uplink shared channel transmission and the number of bits, transmit, after transmitting the uplink grant, a downlink grant indicating scheduling information for a downlink shared channel transmission of the UE, and monitor for feedback for the downlink shared channel transmission based on the number of bits for feedback indicated by the uplink grant.

An apparatus for wireless communications at a base station is described. The apparatus may include means for determining scheduling information for an uplink shared channel transmission for a user equipment and a number of bits for feedback for one or more downlink shared channel transmissions transmitted to a UE after an uplink grant, transmitting the uplink grant indicating the scheduling information for the uplink shared channel transmission and the number of bits, transmitting, after transmitting the uplink grant, a downlink grant indicating scheduling information for a downlink shared channel transmission of the UE, and monitoring for feedback for the downlink shared channel transmission based on the number of bits for feedback indicated by the uplink grant.

A non-transitory computer-readable medium storing code for wireless communications at a base station is described. The code may include instructions executable by a processor to determine scheduling information for an uplink shared channel transmission for a user equipment and a number of bits for feedback for one or more downlink shared channel transmissions transmitted to a UE after an uplink grant, transmit the uplink grant indicating the scheduling information for the uplink shared channel transmission and the number of bits, transmit, after transmitting the uplink grant, a downlink grant indicating scheduling information for a downlink shared channel transmission of the UE, and monitor for feedback for the downlink shared channel transmission based on the number of bits for feedback indicated by the uplink grant.

In the method, apparatuses, and non-transitory computer-readable medium described herein, determining the number of bits for feedback for the one or more downlink shared channel transmissions transmitted to the UE after the uplink grant may include operations, features, means, or instructions for determining a predicted number of bits for feedback for the one or more downlink shared channel transmissions transmitted to the UE after the uplink grant.

The method, apparatuses, and non-transitory computer-readable medium described herein may further include operations, features, means, or instructions for identifying a number of bits for transmission of the feedback by the UE for the downlink shared channel transmission.

The method, apparatuses, and non-transitory computer-readable medium described herein may further include operations, features, means, or instructions for determining that the number of bits for transmission of the feedback by the UE may be less than or equal to the number of bits indicated by the uplink grant, and receiving the feedback based on the determining.

In the method, apparatuses, and non-transitory computer-readable medium described herein, the feedback includes one or more values such that a number of bits for the feedback may be equal to the number of bits indicated by the uplink grant.

In the method, apparatuses, and non-transitory computer-readable medium described herein, receiving the feedback may include operations, features, means, or instructions for receiving the feedback in the uplink shared channel transmission.

The method, apparatuses, and non-transitory computer-readable medium described herein may further include operations, features, means, or instructions for determining that the number of bits for transmitting the generated feedback may be greater than the number of bits indicated by the uplink grant.

The method, apparatuses, and non-transitory computer-readable medium described herein may further include operations, features, means, or instructions for receiving the feedback separate from the uplink shared channel transmission based on the determining.

The method, apparatuses, and non-transitory computer-readable medium described herein may further include operations, features, means, or instructions for determining a value for a multiplexing flag for the downlink grant, where transmitting the downlink grant includes transmitting the multiplexing flag with the value, and receiving the feedback for the downlink shared channel transmission based on the value of the multiplexing flag.

The method, apparatuses, and non-transitory computer-readable medium described herein may further include operations, features, means, or instructions for receiving the feedback in the uplink shared channel transmission may be based on the multiplexing flag.

The method, apparatuses, and non-transitory computer-readable medium described herein, the feedback may be received separate from the uplink shared channel transmission based on the value of the multiplexing flag.

The method, apparatuses, and non-transitory computer-readable medium described herein may further include operations, features, means, or instructions for transmitting, after transmitting the uplink grant, a second downlink grant including the multiplexing flag, where receiving the feedback may be based on the value of the multiplexing flag of a later downlink grant of the downlink grant and the second downlink grant.

The method, apparatuses, and non-transitory computer-readable medium described herein may further include operations, features, means, or instructions for indicating, to the UE, to transmit the feedback in the uplink shared channel transmission or separate from the uplink shared channel transmission based on a modulation and coding scheme corresponding to a physical uplink shared channel scheduled by the uplink grant, a number of feedback bits indicated by the downlink grant, an amount of resources corresponding to the physical uplink shared channel, or any combination thereof, and receiving the feedback based on the indicating.

The method, apparatuses, and non-transitory computer-readable medium described herein may further include operations, features, means, or instructions for identifying whether a ratio of the number of feedback bits to the amount of resources corresponding to the physical uplink shared channel may be greater than a threshold, where the generated feedback may be transmitted in the uplink shared channel transmission or separate from the uplink shared channel transmission based on the ratio.

The method, apparatuses, and non-transitory computer-readable medium described herein may further include operations, features, means, or instructions for monitoring communication patterns of uplink communications, or downlink communications, or both with the UE, where the number of bits may be determined based on the monitoring.

The method, apparatuses, and non-transitory computer-readable medium described herein, the uplink grant indicates the number of bits using a field that also indicates a feedback codebook size corresponding to at least one downlink transmission transmitted before the uplink grant.

The method, apparatuses, and non-transitory computer-readable medium described herein, the uplink grant indicates the number of bits using a first field, and where the uplink grant includes a second field that indicates a feedback codebook size corresponding to at least one downlink transmission transmitted before the uplink grant.

In the method, apparatuses, and non-transitory computer-readable medium described herein, the generated feedback may include one or more values that indicate a decoding status corresponding to the downlink shared channel transmission.

DETAILED DESCRIPTION

Figure 1:
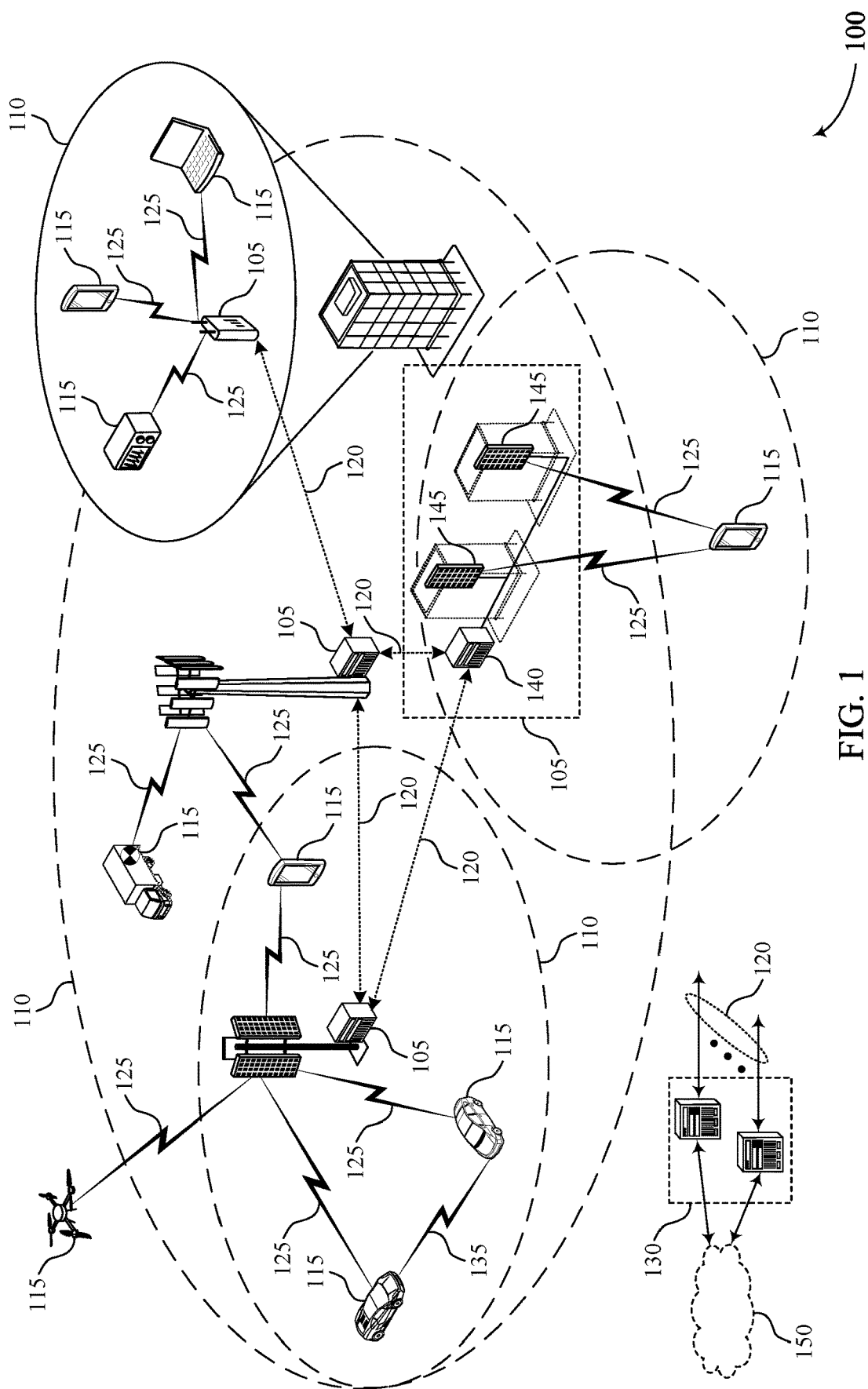
FIG. 1 illustrates an example of a system for wireless communications that supports feedback transmissions based on uplink grants in accordance with aspects of the present disclosure.

Wireless communications systems may communicate control messages (e.g., physical downlink control channel (PDCCH) messages transmitted by a base station) to grant or schedule resources for subsequent data transmissions (e.g., where the data transmissions are sent over a physical downlink shared channel (PDSCH)). If a user equipment (UE) receives and successfully decodes a PDCCH message from a base station, the UE may then monitor the resources indicated by the PDCCH to receive and decode a downlink data transmission scheduled by the PDCCH message. The UE may, in some cases, generate feedback to indicate to the base station as to whether receipt of the downlink data transmission was successful, and thus this feedback may be transmitted to the base station on resources scheduled by the PDCCH message.

In some cases, a base station may transmit an uplink grant to the UE indicating a set of resources for uplink shared channel transmissions in addition to resources for feedback corresponding one or more earlier PDSCH transmissions transmitted before the uplink grant. In accordance with the uplink grant, the UE may transmit feedback to a base station using resources scheduled for an uplink shared channel (e.g., a physical uplink shared channel (PUSCH)). However, in some cases, after transmitting the uplink grant, the base station may subsequently transmit a downlink grant that indicates resources scheduled for another later physical downlink shared channel (PDSCH) transmission for the UE. The UE may generate feedback for the later PDSCH transmission and transmit the feedback to the base station via the PUSCH resources scheduled by the uplink grant. However, because a later downlink transmission (e.g., the later PDSCH transmission) may follow the uplink grant, the uplink grant sent by the base station may not accurately schedule resources for feedback for the later downlink transmission. Accordingly, sizing misalignment may exist between the resources scheduled by the base station via the uplink grant and the resources identified by the UE for transmitting the feedback for the later downlink transmission, which may be, in some cases, in addition to feedback for an earlier downlink transmission (e.g., before the uplink grant). Further, transmission of the feedback for the later downlink transmission on the resources of the PUSCH (e.g., scheduled for the earlier downlink transmission) may affect performance of the PUSCH, among other challenges.

In accordance with examples described herein, a base station may identify and schedule a set of bits in the PUSCH which may be used for transmission of feedback for downlink transmissions which occur after transmission of the uplink grant scheduling the PUSCH. More particularly, the base station may predict or reserve the number of bits to use for the feedback based on information, such as based on monitoring traffic patterns, for example. The base station may signal these "extra" (e.g., predicted or reserved) bits indicated by in the uplink grant. Thus, after receiving the uplink grant, the UE may receive PDCCH transmissions that schedule subsequent downlink transmissions (e.g., PDSCH transmissions). The UE may monitor for and generate feedback for the downlink transmissions based at least in part on the UE's ability to successfully decode the downlink transmissions. The UE may then utilize the bits indicated by the UL grant to transmit the feedback. Accordingly, the UE may multiplex the feedback with the uplink data transmission on the resources of the PUSCH. In some examples, the UE may determine whether the indicated bits are adequate to transmit the feedback for the later downlink transmissions. In cases where the UE determines that the indicated bits are not adequate (e.g., there are not enough bits), then the UE may determine to transmit the feedback via resources (e.g., resources scheduled by the PDCCH transmissions) separate from the PUSCH resources scheduled by the uplink grant.

In some examples, the PDCCH transmissions that scheduled the subsequent downlink transmissions after the uplink grant may include an indication of whether the UE is to multiplex the feedback with the uplink shared channel transmission on the resources of the PUSCH or not. Here, the base station may transmit the uplink grant including the indication of the bits to use for the feedback for the subsequent downlink transmissions. The base station may then transmit the PDCCH transmissions scheduling the subsequent downlink transmissions, and the PDCCH transmissions may include an indication of whether the feedback for the subsequent downlink transmissions should be transmitted using the resources of the PUSCH (e.g., using the indicated bits) or transmitted via resources separate from the resources of the PUSCH. Accordingly, the UE may transmit the feedback for the subsequent downlink transmissions in accordance with the indication included in the PDCCH transmissions.

Aspects of the subject matter described herein may be implemented to realize one or more advantages. The described techniques may support improvements in the feedback framework, decreasing signaling overhead, and improving reliability, among other advantages. As such, the supported techniques may include improved network operations and, in some examples, may promote network efficiencies, among other benefits. Aspects of the disclosure are initially described in the context of wireless communications systems. Aspects of the disclosure are further described with respect to a wireless communication system, timing diagrams, and a process flow diagram. Aspects of the disclosure are further illustrated by and described with reference to apparatus diagrams, system diagrams, and flowcharts that relate to feedback transmissions based on uplink grants.

FIG. 1 illustrates an example of a wireless communications system 100 that supports feedback transmissions based on uplink grants in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may implement control messages (e.g., physical downlink control channel PDCCH messages transmitted by a base station 105) to grant or schedule resources for subsequent data transmissions (e.g., where the data transmissions are sent over a PDSCH).

If a UE 115 receives and successfully decodes a PDCCH message from a base station 105, the UE 115 may then monitor the resources indicated by the PDCCH message to receive and decode a downlink data transmission scheduled by the PDCCH message. The UE 115 may, in some cases, generate feedback for the base station 105 to indicate whether receipt and decoding of the downlink data transmission was successful (e.g., a decoding status) and transmit this feedback to the base station 105.

In some cases, the feedback for a downlink transmission may be transmitted to the base station 105 on resources of a PUSCH scheduled by an uplink grant. However, in various implementations, the PDCCH that may include the downlink grant that schedules the feedback may not be transmitted after the uplink grant that schedules the PUSCH. In cases where the uplink grant is after the downlink grant that schedules the feedback, the uplink grant may include a field that indicates a codebook size of the feedback (e.g., a HARQ-ack codebook size) for transmission of the feedback on the PUSCH. Some implementations may allow feedback for a downlink transmission that occurs after the uplink grant to be transmitted separately from a PUSCH transmission. In some cases, such feedback may be transmitted instead of the PUSCH transmission.

According to some implementations, a UE 115 may transmit feedback for a downlink transmission occurring before an uplink grant using resources of the PUSCH. However, since the uplink grant scheduling the PUSCH may include a field indicating a codebook size for resources of the PUSCH that may include the feedback, the uplink grant may not include the codebook size information corresponding to a feedback for a later downlink transmission occurring after the uplink grant. As such, transmission of the feedback, for such a later occurring downlink transmission, on resources of the PUSCH may cause size misalignment between the UE 115 and the base station 105. In such cases, the base station 105 may not be able to decode the PUSCH. Further, transmission of feedback for a downlink transmission occurring after the uplink grant on a PUSCH scheduled by the uplink grant may impact the performance of the PUSCH.

According to implementations described herein, a base station 105 may solve these problems by dedicating some extra bits in PUSCH scheduling, and the extra bits may be used for feedback for later downlink transmissions occurring after the uplink grant. The base station 105 may identify a number of extra bits (e.g., reserved bits) based on various communication characteristics. In one example, the base station 105 monitors communication traffic patterns and predicts the number of bits that may be needed for feedback based on the traffic patterns. The base station 105 may indicate the extra bits using a field in the uplink grant. For example, an existing downlink assignment index (DAI) field may indicate the feedback codebooks for prior downlink transmissions as well as for a later downlink transmission occurring after the uplink grant (e.g., the extra bits). In another example, an additional field in the downlink grant for such a later downlink transmission may be used to indicate the extra bits.

Thus, a UE 115 may receive the uplink grant that schedules resources for the PUSCH and that may include the indication of one or more bits to be used for feedback for downlink transmissions occurring after the uplink grant. The UE 115 may then receive the PDCCH scheduling the downlink transmissions, monitor for the downlink transmissions, and generate the feedback based at least in part on the monitoring. The feedback include one or more values that indicate a decoding status of the downlink transmission. For example, the UE 115 generates an acknowledgement (ACK) (e.g., a value of "1") upon successful decoding of the downlink transmissions and generates a negative acknowledgement (NACK) (e.g., a value of "0") upon a failure to receive/decode the downlink transmissions. The UE 115 may use the indicated bits in the PUSCH to transmit the feedback. In some cases, the UE 115 may consider the amount of extra bits indicated before transmitting the feedback using the PUSCH. For example, the UE 115 may determine whether the amount of extra bits is enough to transmit the feedback. If the UE 115 determines that the extra bits are not enough to account for the feedback corresponding to the downlink transmissions occurring after the uplink grant, then the UE 115 may determine to transmit the feedback separate from the PUSCH. In some cases, the UE 115 may determine to transmit the feedback instead of the PUSCH.

Accordingly, the base station 105 may schedule resources of the PUSCH using an uplink grant such that the UE 115 may transmit feedback for one or more downlink transmissions occurring after the uplink grant. Moreover, the UE 115 and the base station 105 may avoid feedback codebook misalignment problems and avoid performance hits by transmitted unscheduled (or unaccounted for) later feedback on (or separately from) the PUSCH. Other techniques may provide other enhancements. For example, downlink grants that occur after the uplink grants may include a multiplexing flag that indicates whether the UE 115 should multiplex the later feedback with the PUSCH transmission or transmit the feedback separately. These and other implementations are further described with respect to the following figures.

Figure 2:
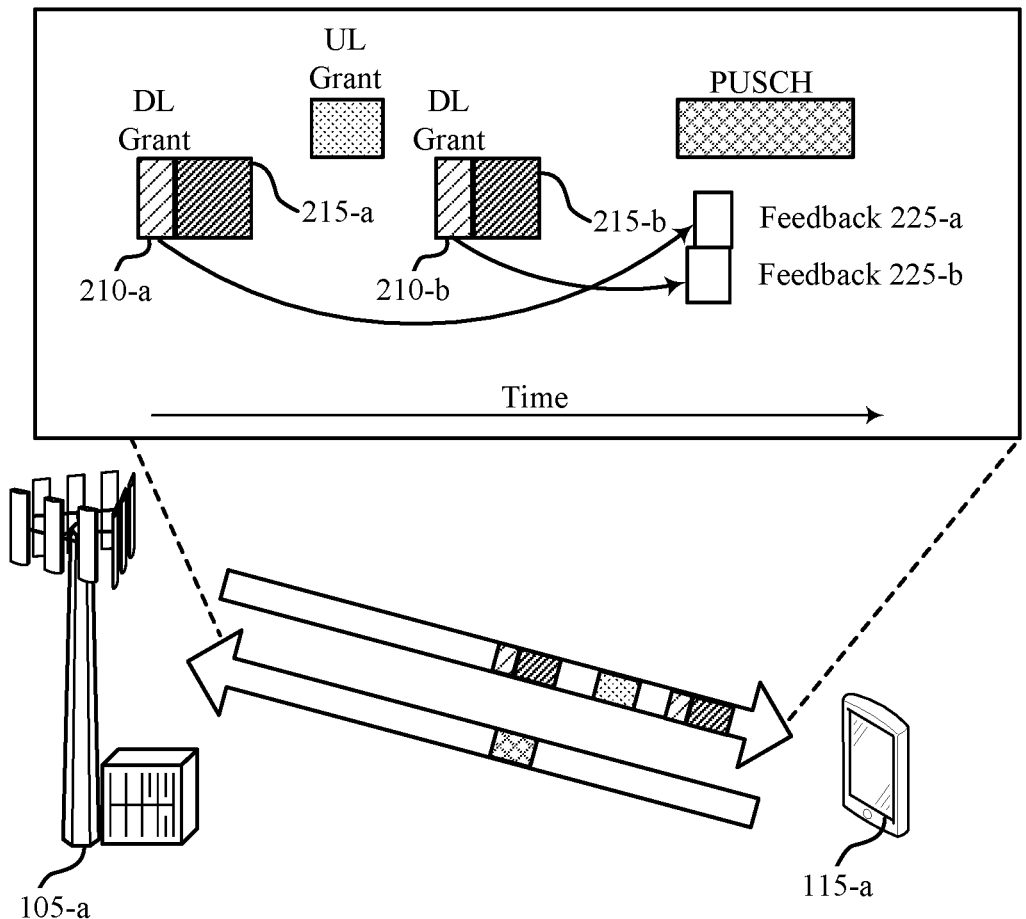
FIG. 2 illustrates an example of a wireless communications system that supports feedback transmissions based on uplink grants in accordance with aspects of the present disclosure.

FIG. 2 illustrates an example of a wireless communications system 200 that supports feedback transmissions based on uplink grants in accordance with aspects of the present disclosure. In some examples, wireless communications system 200 may implement aspects of wireless communications system 100. The wireless communications system 200 may include a base station 105-a and a UE 115-a, which may be examples of the corresponding devices of FIG. 1. The base station 105-a may transmit various control channel transmissions on resources of a PDCCH that may include scheduling information, such as uplink (UL) grants 205 and downlink (DL) grants 210. The downlink grants 210 may schedule resources of a data transmissions, such as PDSCH 215 resources, and the uplink grants 205 may schedule resources for uplink transmissions, such as PUSCH 220.

As illustrated in FIG. 2, a downlink grant 210-a may schedule a downlink transmission in resources of a PDSCH 215-a. The downlink grant 210-a may also schedule feedback 225-a for the downlink transmission in resources of the PUSCH 220, which may be scheduled by uplink grant 205. A downlink grant 210-b may schedule a downlink transmission in resources of a PDSCH 215-b. The downlink grant 210-b may also schedule feedback 225-b for the downlink transmission in resources of the PUSCH 220. The uplink grant 205 may be received after the downlink grant 210-a and the PDSCH 215-a. The uplink grant 205 may include an indication of a feedback codebook size corresponding to a downlink transmission occurring before the uplink grant. For example, the uplink grant 205 may include a DAI field that indicates a feedback codebook size for feedback 225-a corresponding to the downlink transmission of the PDSCH 215-a occurring before the uplink grant 205.

The uplink grant 205 may also include an indication of a number of bits for feedback 225-b corresponding to a downlink shared channel transmission (e.g., a transmission in PDSCH 215) occurring after the uplink grant 205, and the number of bits may be a predicted number of bits, reserved number of bits, or the like. In some cases, the DAI field that indicates the feedback codebook size for the feedback 225-*a* may also indicate the number of bits of the feedback 225-*b*. More particularly, the DAI may indicate the total number of feedback bits that the UE may transmit, where the feedback bits may correspond to the downlink shared channel transmissions received both prior to and after the uplink grant. In other cases, downlink control information (DCI) for the uplink grant 205 may include an additional field (e.g., separate from the DAI field) that may indicate the number of bits for the feedback 225-*b*. Thus, rather than reserving bits in an uplink shared channel transmission for feedback being based on predefined criterion or being preconfigured by higher layer signaling (RMSI, OSI RRC signaling), the uplink grant 205, which may be an example of a dynamic grant that includes scheduling information for a PUSCH, dynamically indicates (e.g., via physical layer signaling) the reserved or extra bits to use for feedback (e.g., in the PUSCH) for a downlink transmission occurring after the grant. This technique provides flexibility over higher layer signaling to reserve bits, as dynamic signaling allows the base station to account for different communication patterns to determine the extra bits to indicate via the uplink grant 205, which may reduce signaling overhead and improve throughput, among other benefits.

Accordingly, the UE 115-*a* may utilize the resources of the PUSCH 220 to transmit the feedback 225-*a* and the feedback 225-*b*. However, in some cases, the UE 115-*a* may consider whether the number of bits indicated by the uplink grant 205 are adequate for transmission of the feedback 225-*b*. That is, the UE 115-*a* may identify a number of bits that may be needed to transmit the feedback 225-*b* for the downlink transmission of PDSCH 215-*b*. The UE may compare the identified number of bits to the number of bits indicated by the uplink grant 205 (e.g., a predicted size as described herein including with reference to FIGS. 3A and 3B). If the identified number of bits is greater than the number of bits indicated by the uplink grant 205 (e.g., the predicted size), then the UE 115-*a* may determine to transmit the feedback 225-*b* separate from the PUSCH 220. In such cases, the UE 115-*a* may drop (e.g., not transmit) the PUSCH 220. In other cases, the UE may identify an error when the identified number of bits is greater than the number of bits indicated by the uplink grant 205. That is, the UE 115 may not expect that the indicated bits for the downlink shared channel transmission received after the uplink grant 205 to be smaller than the HARQ-ack bits for the downlink shared channel transmission which is scheduled (e.g., via the downlink grants 210). If the identified number of bits is less than or equal to the number of bits indicated by the uplink grant 205, then the UE 115-*a* may determine to transmit the feedback 225-*b* using resources of the PUSCH 220. In cases where the identified number of bits is less than the number of bits indicated by the uplink grant 205, the UE 115-*a* may insert one or more bits/values in the feedback 225-*b* such that the number of bits in the feedback 225-*b* is equal to the number of bits indicated by the uplink grant 205. That is, the UE 115-*a* may zero-pad (e.g., insert a set of "0s") the HARQ-ack codebook until the size matches the predicted size. It should be understood that values other than "0" may be inserted, depending on the implementation or configuration.

From the perspective of the base station 105-*a*, the base station may monitor the number of HARQ-ack bits needed for feedback for the downlink transmissions occurring after the uplink grant 205. More particularly, the base station 105-*a* may not schedule more HARQ-ack feedbacks (e.g., using downlink grants 210) once the number of HARQ-ack bits scheduled by downlink grants 210 occurring after the uplink grant 205 reach the number of bits predicted and indicated by the uplink grant 205. Accordingly, the base station 105-*a* may avoid identification of errors at the UE 115-*a*.

Figure 3A:
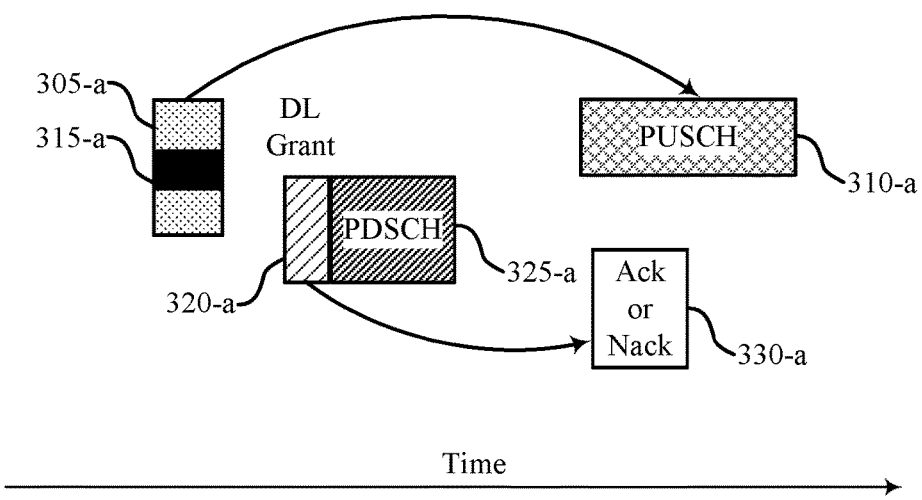
FIGS. 3A and 3B illustrate examples of timing diagrams that support feedback transmissions based on uplink grants in accordance with aspects of the present disclosure.
Figure 3B:
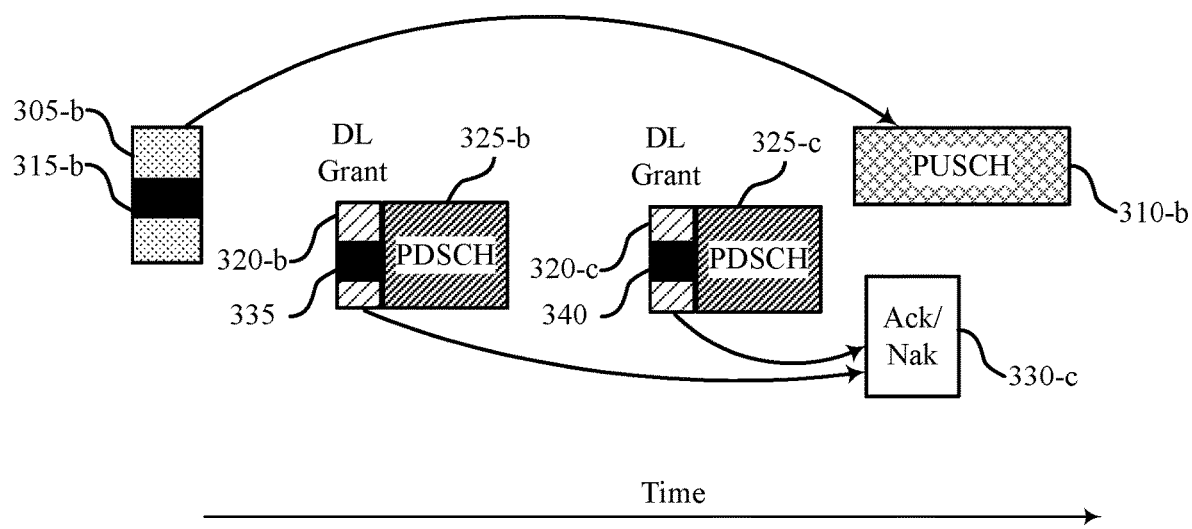

FIG. 3A and FIG. 3B illustrate examples of timing diagrams 300 that support feedback transmissions based on uplink grants in accordance with aspects of the present disclosure. In some examples, the timing diagrams 300 may be implemented by aspects of wireless communications system 100 or 200. The timing diagrams 300 may be implemented by a base station 105 or a UE 115 or both as described with respect to FIGS. 1 and 2. The timing diagram 300-*a* may include an uplink grant 305-*a* that may schedule resources of a PUSCH 310-*a*. The uplink grant 305-*a* also may include an indication 315-*a* of a number of bits for feedback for one or more downlink shared channel transmissions that occur after the uplink grant 305-*a*. A base station 105 may monitor traffic patterns and predict a number of bits based on a predicted number of downlink transmissions that may occur after the uplink grant 305-*a*. For example, based on past behavior of one or more devices such as the base station 105 or the UE 115 or another device, the base station 105 may predict that one downlink transmission may occur between the uplink grant 305-*a* and the PUSCH 310-*a*. The base station 105 may identify a number of bits to account for feedback for the predicted downlink transmission that may occur after the uplink grant 305-*a*, and the indication 315-*a* may identify the number of bits (e.g., reserved or predicted bits) for feedback for the potentially occurring downlink transmission. Accordingly, the uplink grant 305-*a* may schedule different (e.g., separate or overlapping) resources for downlink transmission occurring before the uplink grant 305-*a* and after the uplink grant 305-*a*.

Although some operations are described below as relating to the base station 105 or the UE 115, other devices (including but not limited to the UE 115, the base station 105, or others) can also implement the aspects described as relating to timing diagram 300-*a*. The timing diagram 300-*a* may include a downlink grant 320-*a* (e.g., in resources of a PDCCH) that schedules a transmission in resources of a PDSCH 325-*a*. Based on the scheduling information of the downlink grant 320-*a*, the device, such as UE 115, may monitor for a downlink shared channel transmission (e.g., in resources of the PDSCH 325-*a*). If the device, such as UE 115, receives and successfully decodes the downlink transmission in the PDSCH 325-*a*, then the device, such as UE 115, may generate an ACK as feedback 330-*a* corresponding to the downlink transmission. If the device, such as UE 115, is unable to successfully decode the downlink transmission in the PDSCH 325-*a*, then the device, such as UE 115, may generate a NACK as the feedback 330-*a* corresponding to the downlink transmission. The feedback 330-*a* may be transmitted on the resources of the PUSCH 310-*a* scheduled by the uplink grant 305 or separate from the PUSCH 310-*a* depending on the indication 315-*a*. For example, the device, such as UE 115, may determine whether the number of bits identified by the indication 315-*a* is enough bits for the feedback 330-*a*. If the number of bits is enough to carry the feedback 330-*a*, then the device, such as UE 115, may transmit the feedback in the corresponding resources of the PUSCH 310-*a*. In such cases, the UE 115 may insert additional values (e.g., 0s) such that the number of bits of the feedback 330-*a* may be equal to the number of bits indicated by the indication 315-*a*. If the number of bits is not enough to carry the feedback 330-*a*, then the device, such as UE 115, may determine to transmit the feedback 330-*a* separate from the PUSCH 310-*a*. In such cases, the device, such as UE 115, may determine to drop (e.g., not transmit) an uplink transmission on the resources of the PUSCH 310-*a*.

The timing diagram 300-*b* may include an uplink grant 305-*b* that schedules resources of a PUSCH 310-*b*. As described with respect to timing diagram 300-*a*, the uplink grant 305-*b* also may include an indication 315-*b* of a number of bits (e.g., a predicted or reserved number of bits) for feedback for one or more downlink shared channel transmissions that may occur after the uplink grant 305-*b*. The number of bits indicated by the indication 315-*b* may be based on a predicted number of downlink transmissions that may occur after the uplink grant 305-*b*. The timing diagram 300-*b* also may include downlink grants 320-*b* and 320-*c* that may occur after the uplink grant 305-*b* and schedule downlink transmissions in resources of PDSCH 325-*b* and PDSCH 325-*c*, respectively. Based on the scheduling information in the downlink grants 320-*b* and 320-*c*, the device, such as UE 115, may monitor for the downlink transmissions and generate feedback 330-*c* for each of the downlink transmissions.

Each of the downlink grants 320-*b* and 320-*c* may also include a multiplexing flag (e.g., multiplexing flag 335 in downlink grant 320-*b* and multiplexing flag 340 in downlink grant 320-*c*) that indicates whether the device, such as UE 115, should multiplex the feedback 330-*c* with an uplink transmission on resources of the PUSCH 310-*b* or transmit the feedback 330-*c* separately. As such, in some implementations and when there is one downlink grant and downlink transmission occurring after the uplink grant 305-*b*, the device, such as UE 115, may multiplex the feedback 330-*c* or not based at least in part on a multiplexing flag included in the downlink grant 320. In the case of multiple downlink grants and downlink transmissions occurring after the uplink grant 305-*b* as illustrated in FIG. 3B, the device, such as UE 115, may determine to multiplex the feedback 330-*c* with the resources of PUSCH 310-*b* or transmit the feedback 330-*c* separately based on the value of the multiplexing flag of the latest downlink grant. In timing diagram 300-*b*, the device, such as UE 115, may determine whether to multiplex the feedback 330-*c* or not based at least in part on the value of multiplexing flag 340 since it is the flag in the latest downlink grant 320-*c*. Using these techniques, a base station 105 may change a multiplexing decision from one downlink grant to the next downlink grant. For example, a base station 105 may indicate to multiplex in a first downlink grant after an uplink grant (e.g., downlink grant 320-*b*) then indicate to transmit the feedback separately (e.g., drop the PUSCH 310-*b*) in the next downlink grant (e.g., downlink grant 320-*c*). The base station 105 may change such behavior when the base station 105 identifies that there may not be enough room in the PUSCH 310-*b* to transmit the feedback for the multiple downlink transmissions.

In some examples, a device, such as UE 115 may implicitly determine whether to multiplex the feedback 330 on resources of the PUSCH 310 or transmit the feedback 330 separately. For example, the UE 115 may determine whether to multiplex or not based on the modulation and coding scheme of the PUSCH, a number of HARQ-ack bits needed for the feedback, number of resources available for the PUSCH, etc. In such cases, the UE 115 and the base station 105 may consider the same rule, such that the base station 105 is configured to identify/decode the feedback (e.g., there is no misalignment about the UE behavior). In one example, the UE 115 and the base station 105 consider a ratio of the number of feedback bits to the amount of resources of the PUSCH 310. If the ratio is above a threshold, then the UE may determine to transmit the feedback separately and the base station may determine that the base station will receive the feedback separate from the PUSCH 310. If the ratio is below a threshold, then the UE 115 may determine to multiplex the feedback 330 on the PUSCH resources. In some examples, the threshold, the process for determining the ratio, and other related information may be configured at the UE by the base station (e.g., using control signaling).

Figure 4:
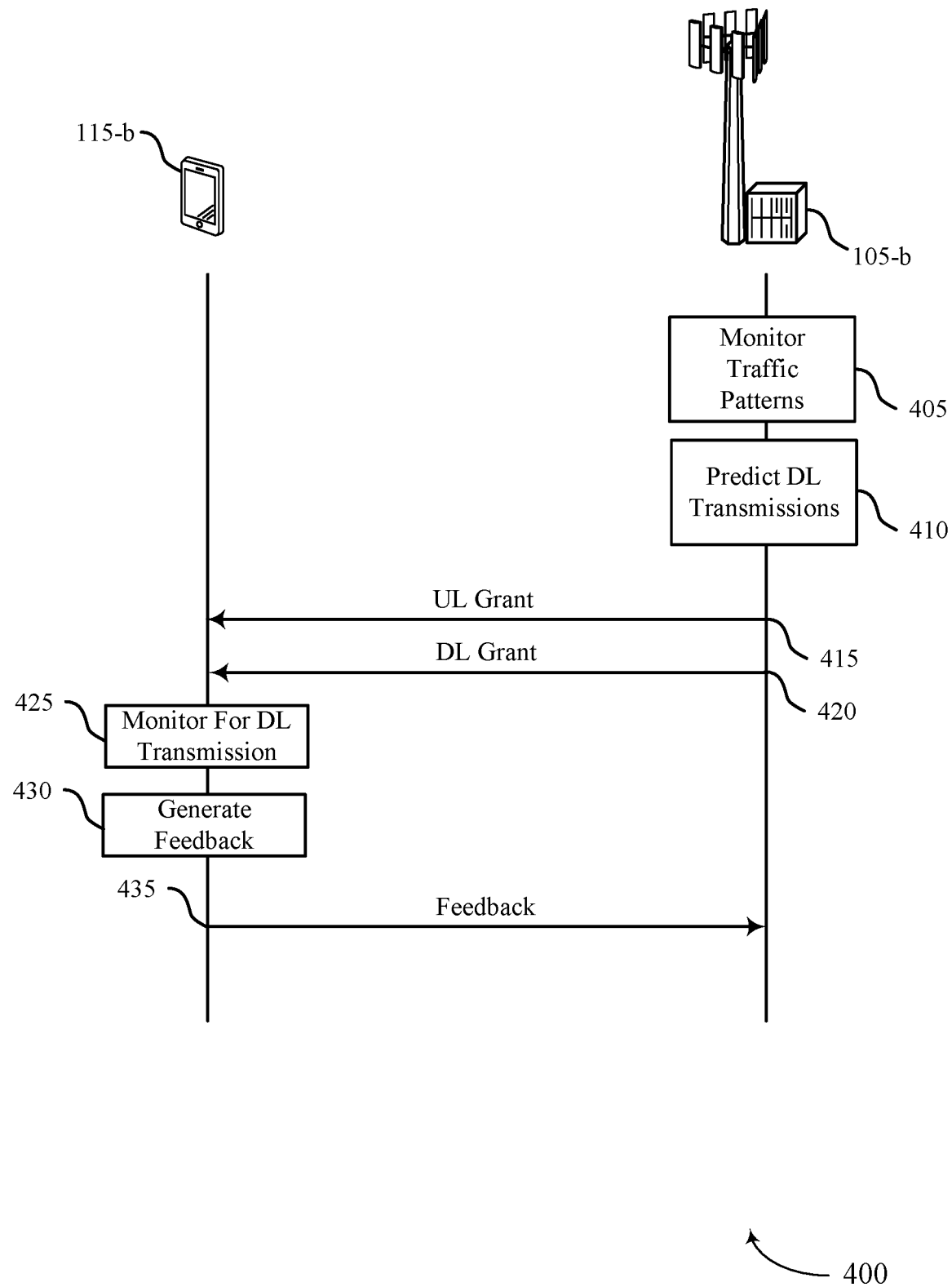
FIG. 4 illustrates an example of a process flow diagram that supports feedback transmissions based on uplink grants in accordance with aspects of the present disclosure.

FIG. 4 illustrates an example of a process flow diagram 400 that supports feedback transmissions based on uplink grants in accordance with aspects of the present disclosure. In some examples, process flow diagram 400 may be implemented by aspects of wireless communications system 100 or 200. The process flow diagram includes a UE 115-*b* and a base station 105-*b*, which may be examples of the corresponding devices of FIGS. 1 through 3.

At 405, the base station 105-*b* may monitor one or more communications (such as communication patterns of uplink communications, or downlink communications, or both) with the UE. At 410, and the base station 410 may predict a number of downlink communications that may be transmitted after an uplink grant based at least in part on the monitoring.

At 415, the UE 115-*b* may receive, from the base station 105-*b*, an uplink grant indicating scheduling information for an uplink shared channel transmission for the UE and indicating a number of bits for feedback for one or more downlink shared channel transmissions that may be received after the uplink grant. The number of bits may include a predicted number of bits determined based on the predicted number of downlink communications that may occur after the uplink grant.

At 420, the UE 115-*b* may receive, from the base station 105-*b*, a downlink grant indicating scheduling information for a downlink shared channel transmission. In some cases, the downlink grant may include a multiplexing flag that indicates whether the UE should transmit the corresponding HARQ-ack feedback on the PUSCH or transmit the HARQ-ack feedback separate from the PUSCH. At 425, the UE 115-*b* may monitor for the downlink shared channel transmission based at least in part on the scheduling information for the downlink shared channel transmission. At 430, the UE 115-*b* may generate feedback associated with the downlink shared channel transmission based at least in part on monitoring for the downlink shared channel transmission. The feedback may comprise a HARQ-ack feedback such as an ACK or NACK.

At 435, the UE 115-*b* may transmit, to the base station 105-*b*, the generated feedback based at least in part on the number of bits for feedback indicated by the uplink grant. In some cases, the feedback is transmitted using resources of the PUSCH. For example, if the UE determines that the number of bits indicated by the uplink grant are enough to carry the feedback for the downlink transmission occurring after the uplink grant, then the UE 115 may transmit the feedback on the resources of the PUSCH. In such cases, the UE 115-*b* may insert a number of values (e.g., 0s) in the feedback such that the number of bits of the feedback is equal to the number of bits indicated by the uplink grant. In another example, the UE 115 may transmit the feedback using resources of the PUSCH based at least in part on a multiplexing flag included in the downlink grant. In some cases, the feedback is transmitted using resources separate from the PUSCH. For example, if the UE determines that the number of bits indicated by the uplink grant are not enough to carry the feedback for the downlink transmission occurring after the uplink grant, then the UE 115-*b* may determine to transmit the feedback separate from the resources of the PUSCH. In such cases, the UE 115-*b* may determine to drop or not transmit an uplink message on resources of the PUSCH. In some examples, the UE 115-*b* may determine to transmit the feedback separate from the PUSCH based at least in part on a multiplexing flag included in the downlink grant. In some examples, the UE 115-*b* determines to transmit the feedback on resources of the PUSCH or not based at least in part on the modulation and coding scheme of the PUSCH, a number of HARQ-ack bits, a number of resources available for PUSCH, or a combination of these.

Figure 5:
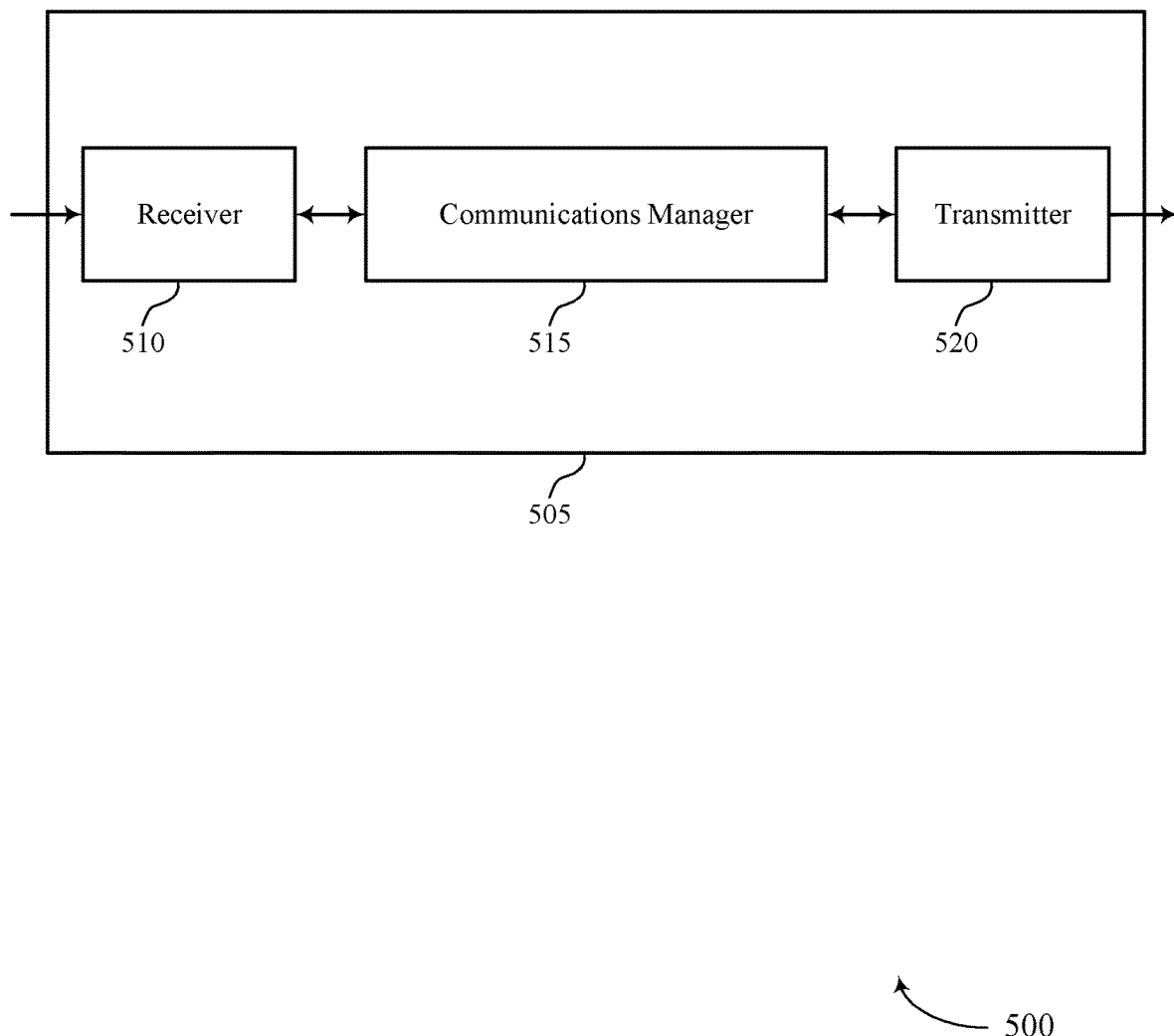
FIGS. 5 and 6 show block diagrams of devices that support feedback transmissions based on uplink grants in accordance with aspects of the present disclosure.

FIG. 5 shows a block diagram 500 of a device 505 that supports feedback transmissions based on uplink grants in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to feedback transmissions based on uplink grants, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an uplink grant indicating scheduling information for an uplink shared channel transmission for the UE and indicating a number of bits for feedback for one or more downlink shared channel transmissions received after the uplink grant. The communications manager 515 may also receive, after receiving the uplink grant, a downlink grant indicating scheduling information for a downlink shared channel transmission. The communications manager 515 may also monitor for the downlink shared channel transmission based on the scheduling information for the downlink shared channel transmission. The communications manager 515 may also generate feedback associated with the downlink shared channel transmission based on monitoring for the downlink shared channel transmission. The communications manager 515 may also transmit the generated feedback based on the number of bits for feedback indicated by the uplink grant. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently provide feedback for downlink communications, and more specifically to coordinate feedback communication from the device 505 to a base station. For example, the device 505 may receive an uplink grant indicating bits to use for feedback for downlink communications received after the bits, generate feedback, and transmit the feedback based on the indication of the bits in the uplink grant.

Based on implementing the feedback mechanism techniques as described herein, a processor of a UE 115 (e.g., controlling the receiver 510, the transmitter 520, or the transceiver 1220 as described with reference to FIG. 12) may increase reliability and decrease signaling overhead in the communication of feedback since the bits may be designated for transmitting the feedback for transmission occurring after the uplink grant.

Figure 6:
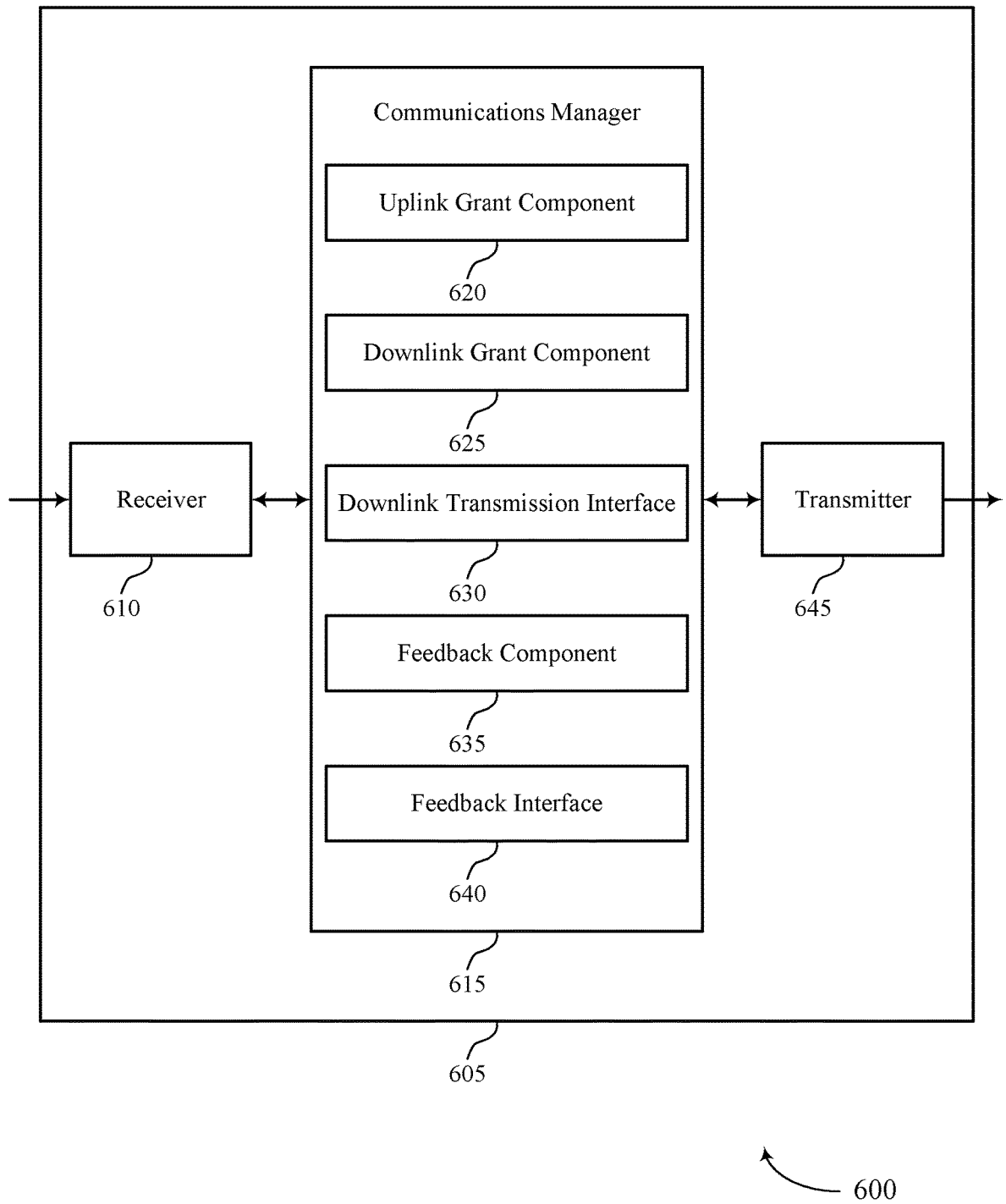

FIG. 6 shows a block diagram 600 of a device 605 that supports feedback transmissions based on uplink grants in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to feedback transmissions based on uplink grants, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink grant component 620, a downlink grant component 625, a downlink transmission interface 630, a feedback component 635, and a feedback interface 640. The communications manager 615 may be an example of aspects of the communications manager 810 described herein.

The uplink grant component 620 may receive an uplink grant indicating scheduling information for an uplink shared channel transmission for the UE and indicating a number of bits for feedback for one or more downlink shared channel transmissions received after the uplink grant.

The downlink grant component 625 may receive, after receiving the uplink grant, a downlink grant indicating scheduling information for a downlink shared channel transmission.

The downlink transmission interface 630 may monitor for the downlink shared channel transmission based on the scheduling information for the downlink shared channel transmission.

The feedback component 635 may generate feedback associated with the downlink shared channel transmission based on monitoring for the downlink shared channel transmission. The feedback interface 640 may transmit the generated feedback based on the number of bits for feedback indicated by the uplink grant.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
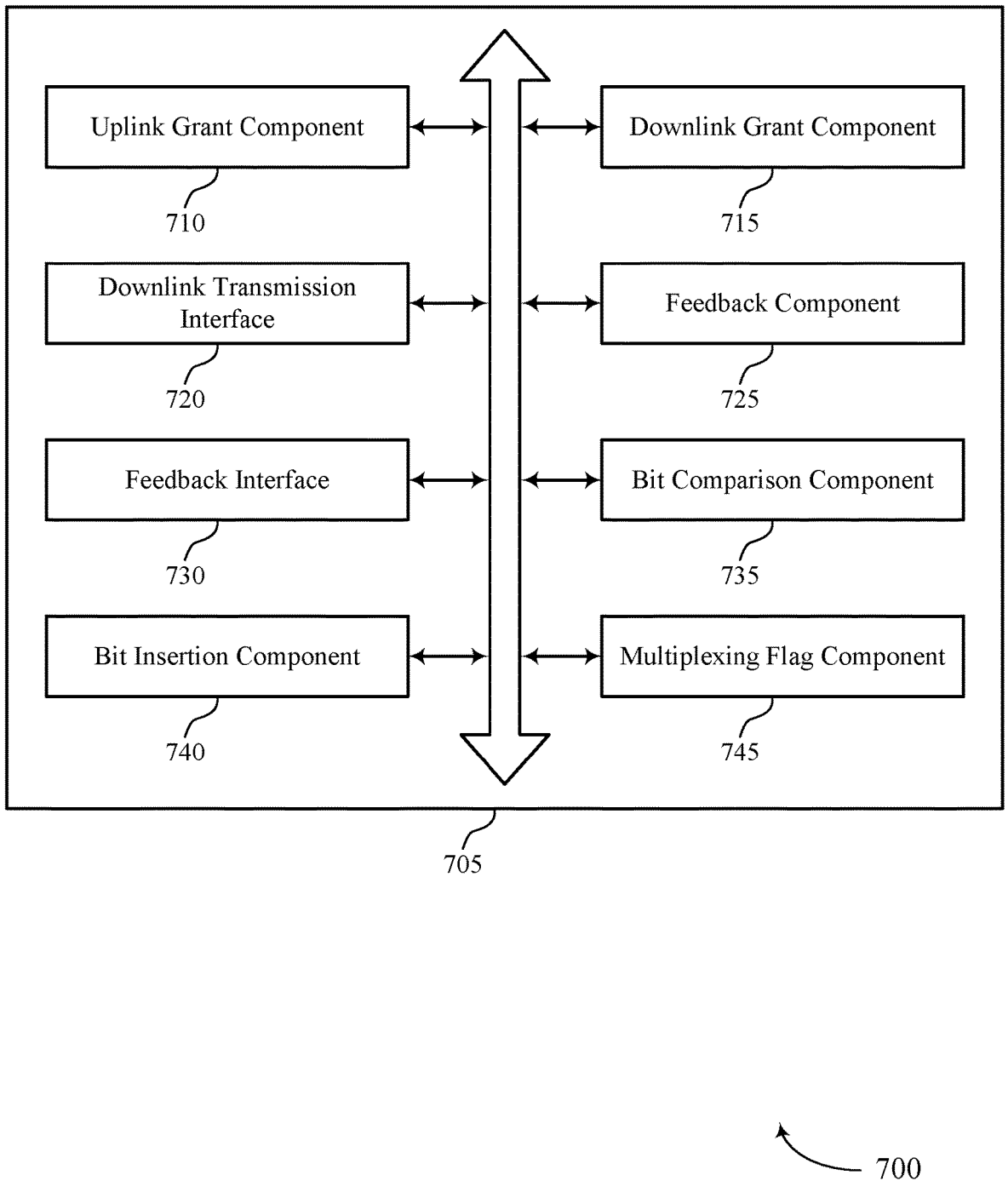
FIG. 7 shows a block diagram of a communications manager that supports feedback transmissions based on uplink grants in accordance with aspects of the present disclosure.

FIG. 7 shows a block diagram 700 of a communications manager 705 that supports feedback transmissions based on uplink grants in accordance with aspects of the present disclosure. The communications manager 705 may be an example of aspects of a communications manager 515, a communications manager 615, or a communications manager 810 described herein. The communications manager 705 may include an uplink grant component 710, a downlink grant component 715, a downlink transmission interface 720, a feedback component 725, a feedback interface 730, a bit comparison component 735, a bit insertion component 740, and a multiplexing flag component 745. Each of these modules may communicate, directly or indirectly, with one another (e.g., via one or more buses).

The uplink grant component 710 may receive an uplink grant indicating scheduling information for an uplink shared channel transmission for the UE and indicating a number of bits for feedback for one or more downlink shared channel transmissions received after the uplink grant. In some examples, the uplink grant component 710 may receive a predicted number of bits for feedback. In some cases, the uplink grant indicates the number of bits using a field that also indicates a feedback codebook size corresponding to at least one downlink transmission transmitted before the uplink grant. In some cases, the uplink grant indicates the number of bits using a first field, and where the uplink grant includes a second field that indicates a feedback codebook size corresponding to at least one downlink transmission transmitted before the uplink grant.

The downlink grant component 715 may receive, after receiving the uplink grant, a downlink grant indicating scheduling information for a downlink shared channel transmission.

In some examples, the downlink grant component 715 may receive, after receiving the uplink grant, a second downlink grant including the multiplexing flag, where the generated feedback is transmitted based at least in part on the value of the multiplexing flag of a later downlink grant of the downlink grant and the second downlink grant. The downlink transmission interface 720 may monitor for the downlink shared channel transmission based on the scheduling information for the downlink shared channel transmission.

The feedback component 725 may generate feedback associated with the downlink shared channel transmission based on monitoring for the downlink shared channel transmission. In some examples, the feedback component 725 may identify a number of bits for transmitting the generated feedback for the downlink shared channel transmission, where the generated feedback is transmitted based on the identified number of bits.

In some examples, the feedback component 725 may determine to transmit the generated feedback separate from the uplink shared channel transmission based on determining that the number of bits for transmitting the generated feedback is greater than the number of bits indicated by the uplink grant, where the generated feedback is transmitted separate from the uplink shared channel transmission. In some examples, the feedback component 725 may multiplex the generated feedback with the uplink shared channel transmission based on the value of the multiplexing flag. In some examples, the feedback component 725 may determine to transmit the generated feedback separate from the uplink shared channel transmission based on the value of the multiplexing flag, where the generated feedback may be transmitted separate from the uplink shared channel transmission.

In some examples, the feedback component 725 may determine whether to transmit the generated feedback in the uplink shared channel transmission or to transmit the generated feedback separate from the uplink shared channel transmission based on a modulation and coding scheme corresponding to a physical uplink shared channel scheduled by the uplink grant, a number of feedback bits indicated by the downlink grant, an amount of resources corresponding to the physical uplink shared channel, or any combination thereof, where the feedback is transmitted based on the determining.

In some examples, the feedback component 725 may identify whether a ratio of the number of feedback bits to the amount of resources corresponding to the physical uplink shared channel is greater than a threshold, where the generated feedback is transmitted in the uplink shared channel transmission or separate from the uplink shared channel transmission based on the ratio. In some cases, the generated feedback is multiplexed with the uplink shared channel transmission based on the scheduling information indicated by the uplink grant. In some examples, the feedback component 725 may generate feedback that includes one or more values that indicate a decoding status corresponding to the downlink shared channel transmission.

The feedback interface 730 may transmit the generated feedback based on the number of bits for feedback indicated by the uplink grant. The bit comparison component 735 may determine that the number of bits for transmitting the generated feedback is less than or equal to the number of bits indicated by the uplink grant, where the generated feedback is transmitted based on the determining.

In some examples, the bit comparison component 735 may determine that the number of bits for transmitting the generated feedback is greater than the number of bits indicated by the uplink grant, where the generated feedback is transmitted based on the determining.

The bit insertion component 740 may insert one or more values in the generated feedback such that the number of bits for transmitting the generated feedback is equal to the number of bits indicated by the uplink grant based on determining that the number of bits for transmitting the generated feedback is less than the number of bits indicated by the uplink grant, where the generated feedback including the one or more values is transmitted based on the inserting. The multiplexing flag component 745 may identify a multiplexing flag in the downlink grant, where the generated feedback is transmitted based on a value of the multiplexing flag.

Figure 8:
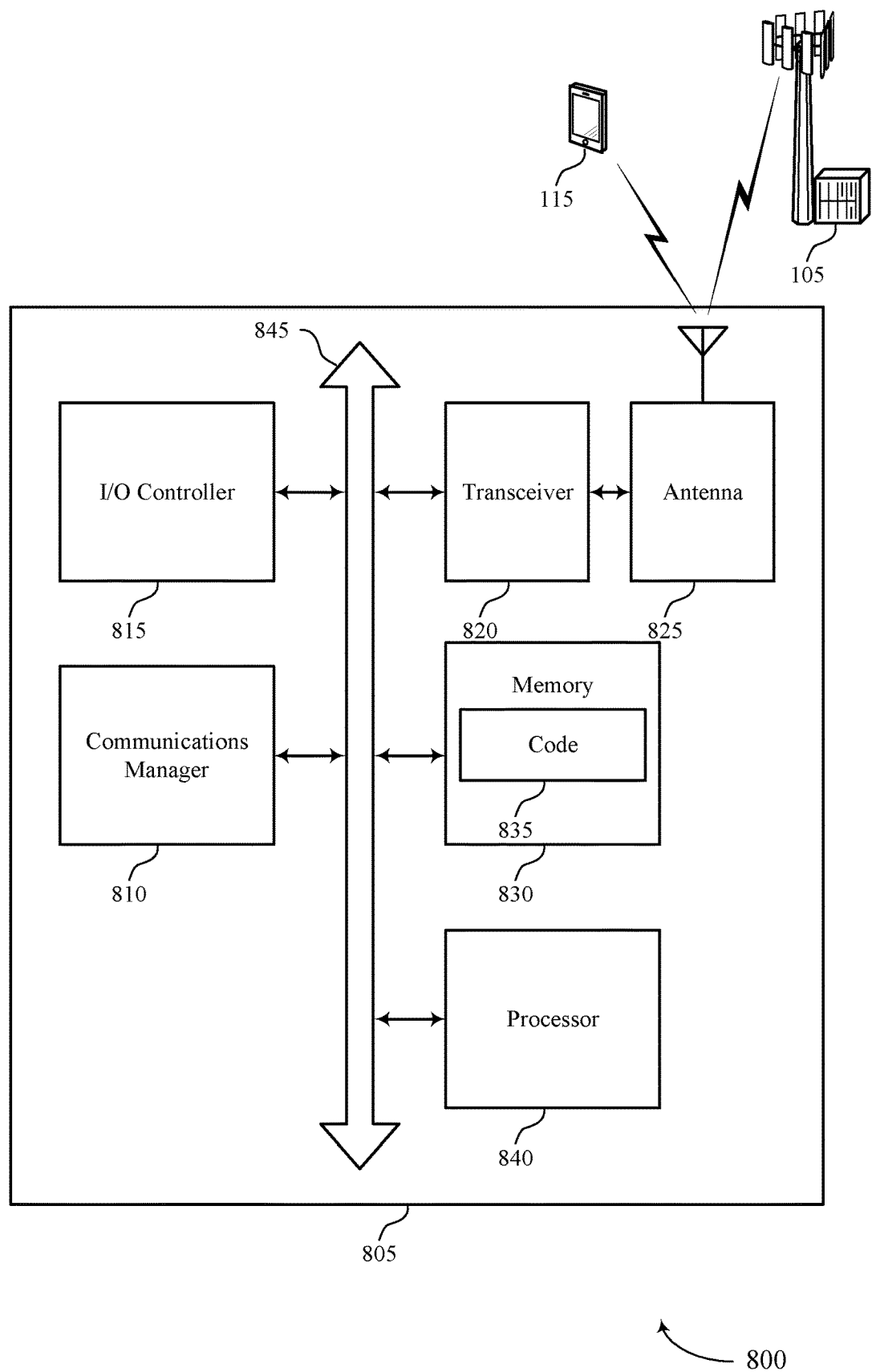
FIG. 8 shows a diagram of a system including a device that supports feedback transmissions based on uplink grants in accordance with aspects of the present disclosure.

FIG. 8 shows a diagram of a system 800 including a device 805 that supports feedback transmissions based on uplink grants in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an uplink grant indicating scheduling information for an uplink shared channel transmission for the UE and indicating a number of bits for feedback for one or more downlink shared channel transmissions received after the uplink grant. The communications manager 810 may receive, after receiving the uplink grant, a downlink grant indicating scheduling information for a downlink shared channel transmission. The communications manager 810 may monitor for the downlink shared channel transmission based on the scheduling information for the downlink shared channel transmission. The communications manager 810 may generate feedback associated with the downlink shared channel transmission based on monitoring for the downlink shared channel transmission. The communications manager 810 may transmit the generated feedback based on the number of bits for feedback indicated by the uplink grant.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback transmissions based on uplink grants).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
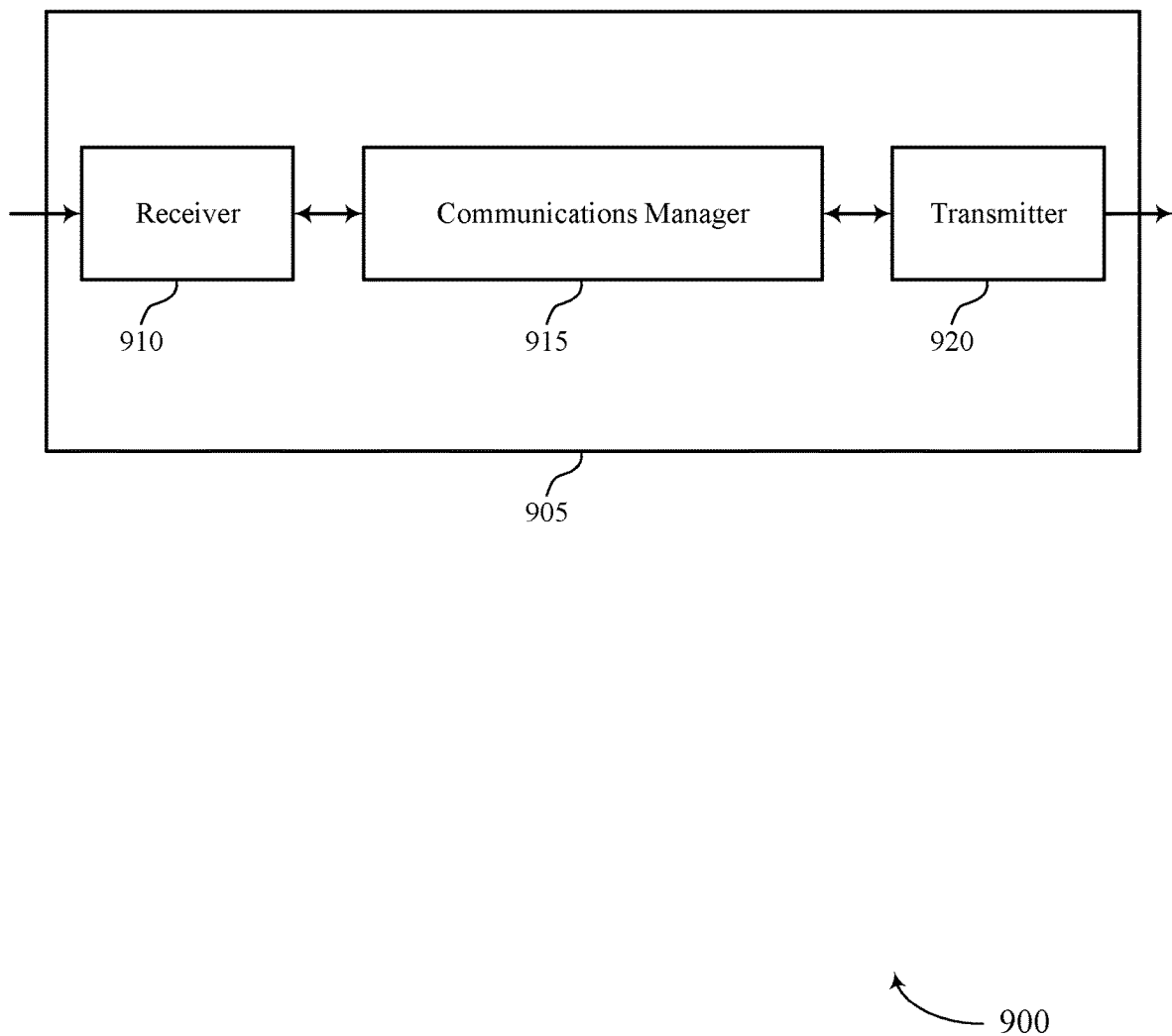
FIGS. 9 and 10 show block diagrams of devices that support feedback transmissions based on uplink grants in accordance with aspects of the present disclosure.

FIG. 9 shows a block diagram 900 of a device 905 that supports feedback transmissions based on uplink grants in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to feedback transmissions based on uplink grants, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine scheduling information for an uplink shared channel transmission for a user equipment and a number of bits for feedback for one or more downlink shared channel transmissions transmitted to a UE after an uplink grant. The communications manager 915 may transmit the uplink grant indicating the scheduling information for the uplink shared channel transmission and the number of bits. The communications manager 915 may transmit, after transmitting the uplink grant, a downlink grant indicating scheduling information for a downlink shared channel transmission of the UE. The communications manager 915 may monitor for feedback for the downlink shared channel transmission based on the number of bits for feedback indicated by the uplink grant. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
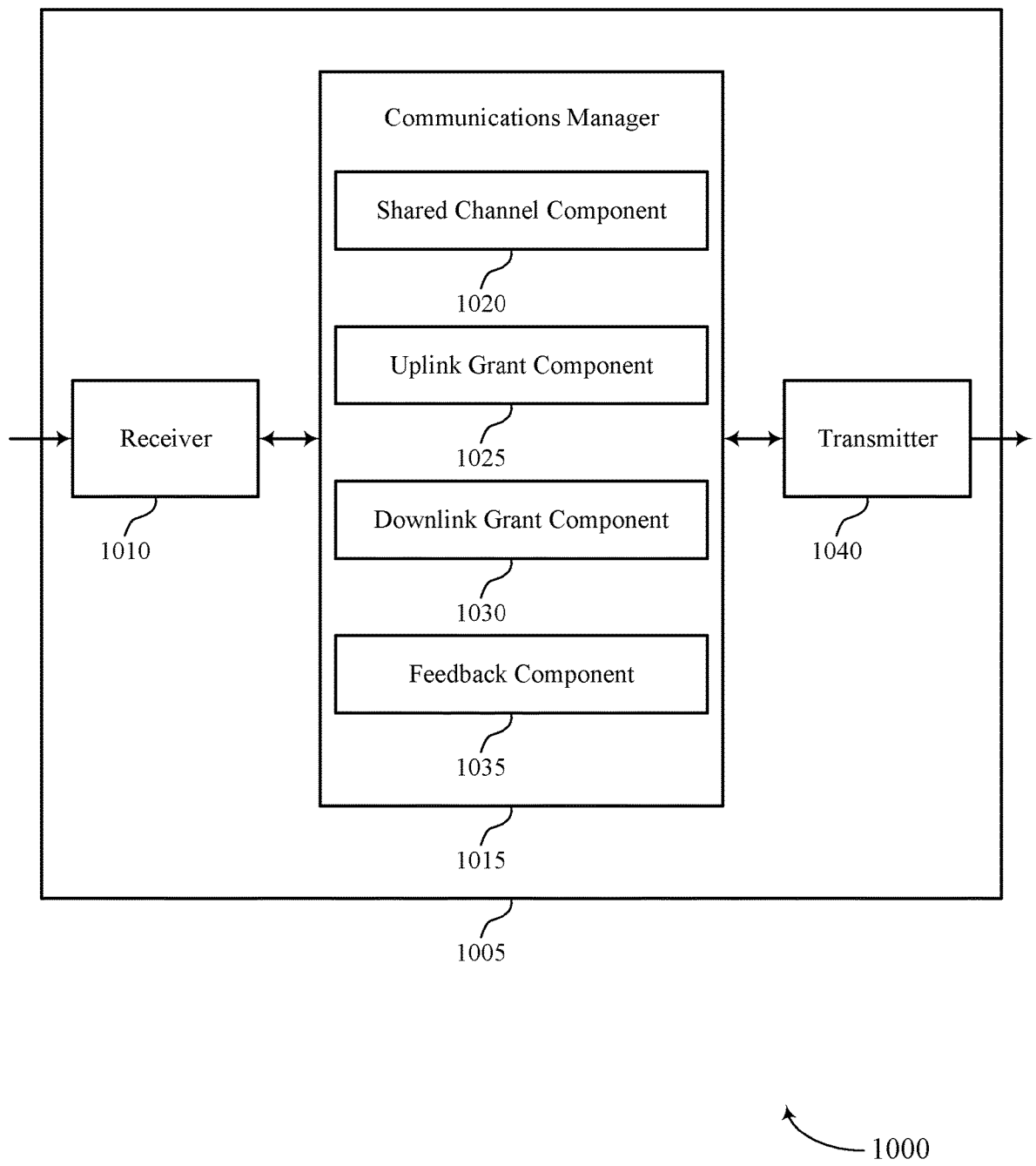

FIG. 10 shows a block diagram 1000 of a device 1005 that supports feedback transmissions based on uplink grants in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback transmissions based on uplink grants, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a shared channel component 1020, an uplink grant component 1025, a downlink grant component 1030, and a feedback component 1035. The communications manager 1015 may be an example of aspects of the communications manager 1210 described herein.

The shared channel component 1020 may determine scheduling information for an uplink shared channel transmission for a user equipment and a number of bits for feedback for one or more downlink shared channel transmissions transmitted to a UE after an uplink grant. The uplink grant component 1025 may transmit the uplink grant indicating the scheduling information for the uplink shared channel transmission and the number of bits.

The downlink grant component 1030 may transmit, after transmitting the uplink grant, a downlink grant indicating scheduling information for a downlink shared channel transmission of the UE. The feedback component 1035 may monitor for feedback for the downlink shared channel transmission based on the number of bits for feedback indicated by the uplink grant.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
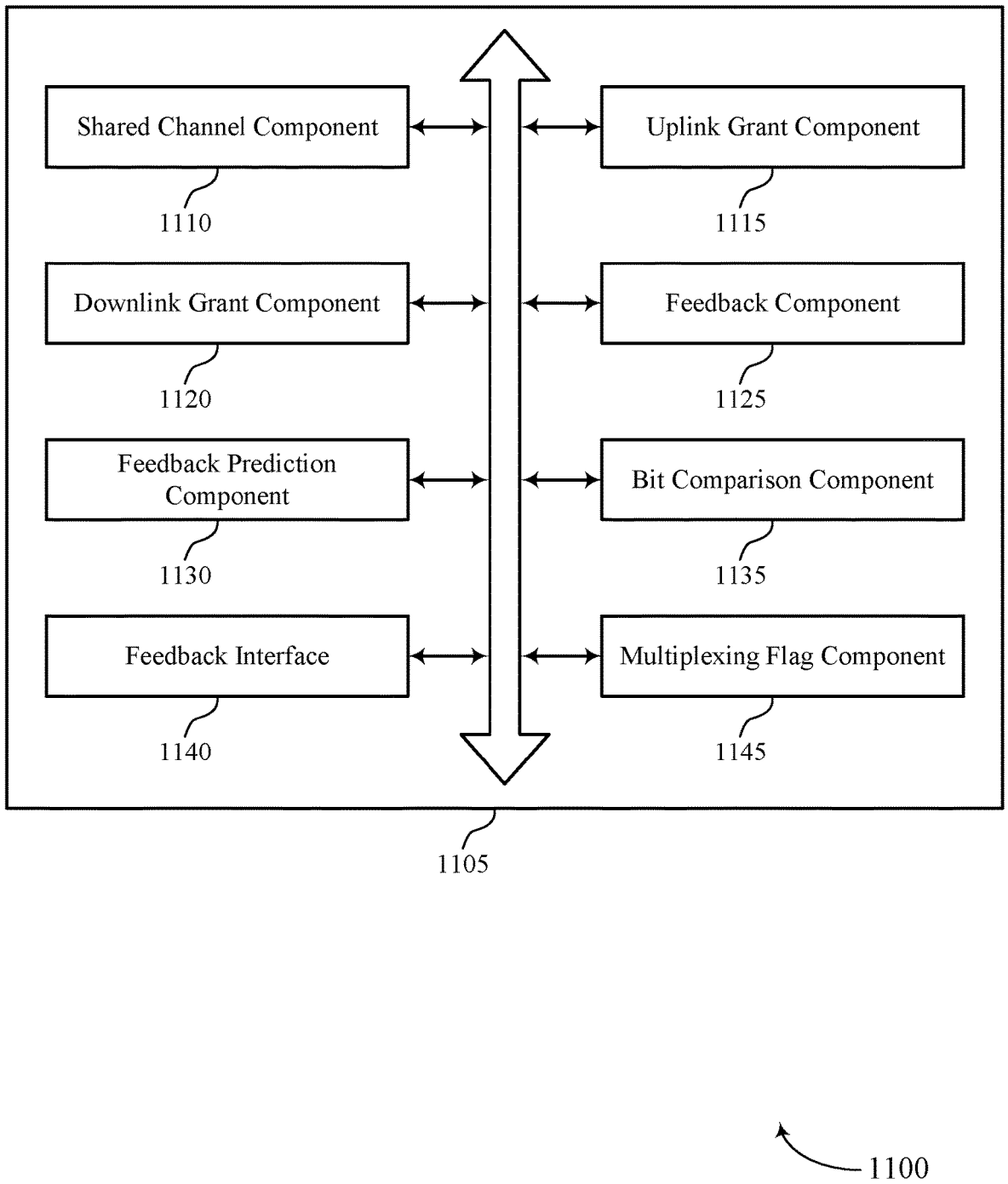
FIG. 11 shows a block diagram of a communications manager that supports feedback transmissions based on uplink grants in accordance with aspects of the present disclosure.

FIG. 11 shows a block diagram 1100 of a communications manager 1105 that supports feedback transmissions based on uplink grants in accordance with aspects of the present disclosure. The communications manager 1105 may be an example of aspects of a communications manager 915, a communications manager 1015, or a communications manager 1210 described herein. The communications manager 1105 may include a shared channel component 1110, an uplink grant component 1115, a downlink grant component 1120, a feedback component 1125, a feedback prediction component 1130, a bit comparison component 1135, a feedback interface 1140, and a multiplexing flag component 1145. Each of these modules may communicate, directly or indirectly, with one another (e.g., via one or more buses).

The shared channel component 1110 may determine scheduling information for an uplink shared channel transmission for a user equipment and a number of bits for feedback for one or more downlink shared channel transmissions transmitted to a UE after an uplink grant.

The uplink grant component 1115 may transmit the uplink grant indicating the scheduling information for the uplink shared channel transmission and the number of bits. In some cases, the uplink grant indicates the number of bits using a field that also indicates a feedback codebook size corresponding to at least one downlink transmission transmitted before the uplink grant. In some cases, the uplink grant indicates the number of bits using a first field, and where the uplink grant includes a second field that indicates a feedback codebook size corresponding to at least one downlink transmission transmitted before the uplink grant.

The downlink grant component 1120 may transmit, after transmitting the uplink grant, a downlink grant indicating scheduling information for a downlink shared channel transmission of the UE.

In some examples, the downlink grant component 1120 may transmit, after transmitting the uplink grant, a second downlink grant including the multiplexing flag, where receiving the feedback is based at least in part on the value of the multiplexing flag of a later downlink grant of the downlink grant and the second downlink grant.

The feedback component 1125 may monitor for feedback for the downlink shared channel transmission based on the number of bits for feedback indicated by the uplink grant. In some examples, the feedback component 1125 may identify a number of bits for transmission of the feedback by the UE for the downlink shared channel transmission. In some examples, the feedback component 1125 may receive the feedback based on the determining. In some examples, receiving the feedback includes receiving the feedback in the uplink shared channel transmission.

In some examples, the feedback component 1125 may indicate, to the UE, to transmit the feedback in the uplink shared channel transmission or separate from the uplink shared channel transmission based on a modulation and coding scheme corresponding to a physical uplink shared channel scheduled by the uplink grant, a number of feedback bits indicated by the downlink grant, an amount of resources corresponding to the physical uplink shared channel, or any combination thereof. In some examples, the feedback component 1125 may generate feedback that includes one or more values that indicate a decoding status corresponding to the downlink shared channel transmission.

In some examples, the feedback component 1125 may identify whether a ratio of the number of feedback bits to the amount of resources corresponding to the physical uplink shared channel is greater than a threshold, where the generated feedback is transmitted in the uplink shared channel transmission or separate from the uplink shared channel transmission based on the ratio.

In some cases, the feedback includes one or more values such that a number of bits for the feedback is equal to the number of bits indicated by the uplink grant. In some cases, the feedback is received separate from the uplink shared channel transmission based on the value of the multiplexing flag.

The feedback prediction component 1130 may determine a predicted number of bits for feedback for the one or more downlink shared channel transmissions transmitted to the UE after the uplink grant.

In some examples, the feedback prediction component 1130 may monitor communication patterns of uplink communications, or downlink communications, or both with the UE, where the number of bits is determined based on the monitoring. The bit comparison component 1135 may determine that the number of bits for transmission of the feedback by the UE is less than or equal to the number of bits indicated by the uplink grant.

In some examples, the bit comparison component 1135 may determine that the number of bits for transmitting the generated feedback is greater than the number of bits indicated by the uplink grant. The feedback interface 1140 may receive the feedback separate from the uplink shared channel transmission based on the determining.

In some examples, the feedback interface 1140 may receive the feedback for the downlink shared channel transmission based on the value of the multiplexing flag. In some examples, the feedback interface 1140 may receive the feedback in the uplink shared channel transmission is based on the multiplexing flag. In some examples, the feedback interface 1140 may receive the feedback based on the indicating.

The multiplexing flag component 1145 may determine a value for a multiplexing flag for the downlink grant, where transmitting the downlink grant includes transmitting the multiplexing flag with the value.

Figure 12:
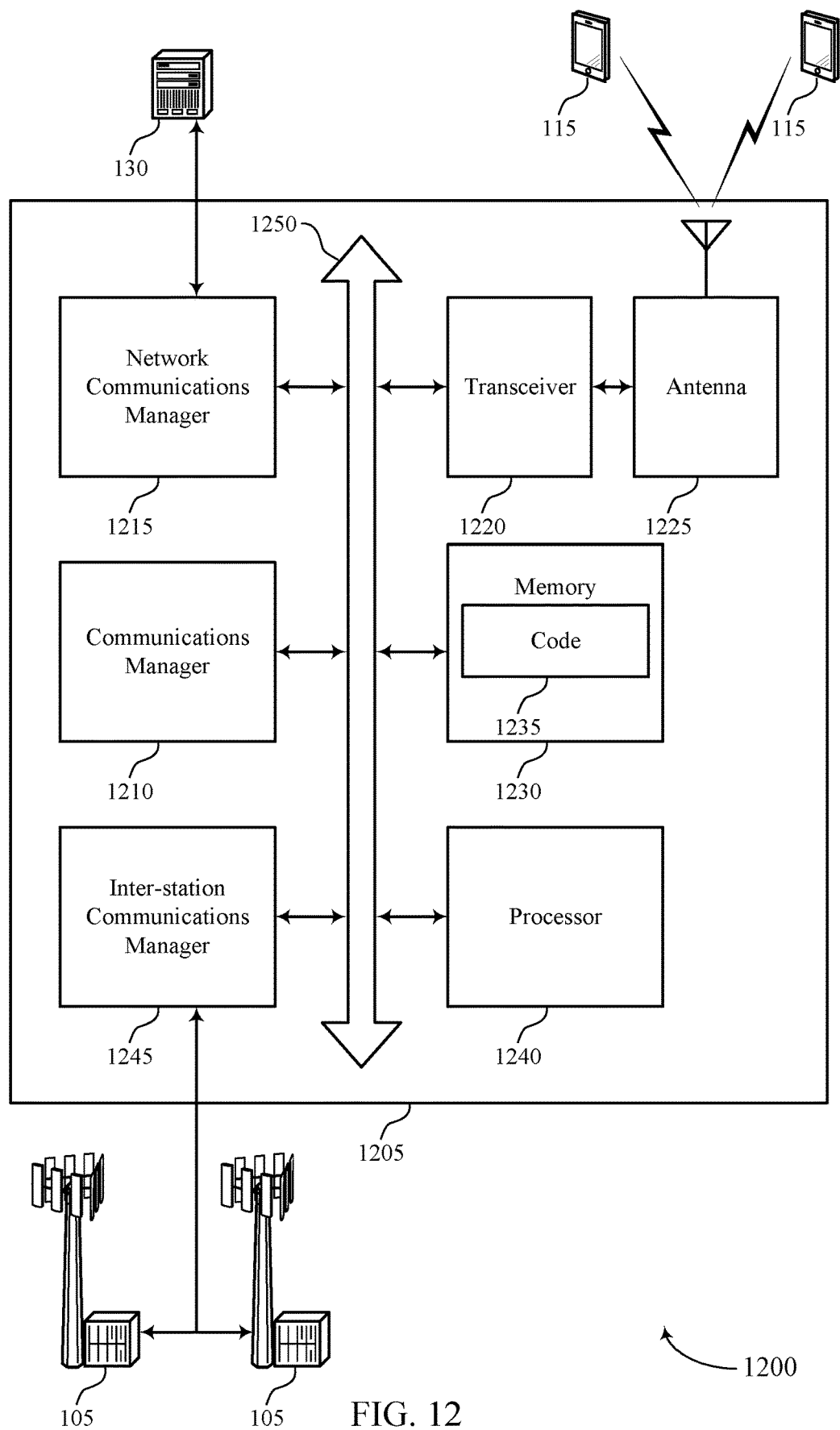
FIG. 12 shows a diagram of a system including a device that supports feedback transmissions based on uplink grants in accordance with aspects of the present disclosure.

FIG. 12 shows a diagram of a system 1200 including a device 1205 that supports feedback transmissions based on uplink grants in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine scheduling information for an uplink shared channel transmission for a user equipment and a number of bits for feedback for one or more downlink shared channel transmissions transmitted to a UE after an uplink grant. The communications manager 1210 may transmit the uplink grant indicating the scheduling information for the uplink shared channel transmission and the number of bits. The communications manager 1210 may transmit, after transmitting the uplink grant, a downlink grant indicating scheduling information for a downlink shared channel transmission of the UE. The communications manager 1210 may monitor for feedback for the downlink shared channel transmission based on the number of bits for feedback indicated by the uplink grant.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting feedback transmissions based on uplink grants).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
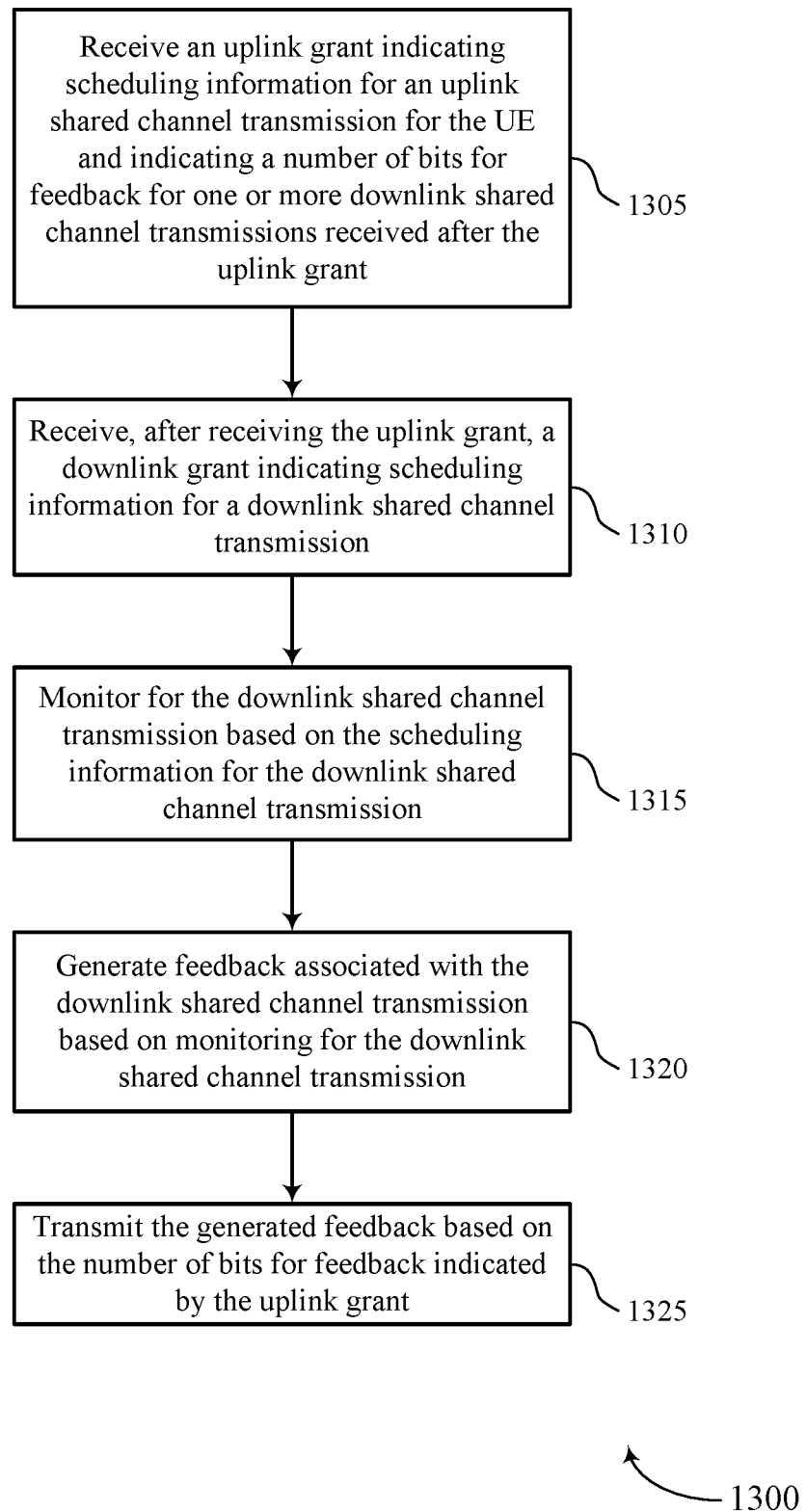
FIGS. 13 and 14 show flowcharts illustrating methods that support feedback transmissions based on uplink grants in accordance with aspects of the present disclosure.

FIG. 13 shows a flowchart illustrating a method 1300 that supports feedback transmissions based on uplink grants in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive an uplink grant indicating scheduling information for an uplink shared channel transmission for the UE and indicating a number of bits for feedback for one or more downlink shared channel transmissions received after the uplink grant. The operations of 1305 may be performed according to the methods described herein. In some examples, aspects of the operations of 1305 may be performed by an uplink grant component as described with reference to FIGS. 5 through 8.

At 1310, the UE may receive, after receiving the uplink grant, a downlink grant indicating scheduling information for a downlink shared channel transmission. The operations of 1310 may be performed according to the methods described herein. In some examples, aspects of the operations of 1310 may be performed by a downlink grant component as described with reference to FIGS. 5 through 8.

At 1315, the UE may monitor for the downlink shared channel transmission based on the scheduling information for the downlink shared channel transmission. The operations of 1315 may be performed according to the methods described herein. In some examples, aspects of the operations of 1315 may be performed by a downlink transmission interface as described with reference to FIGS. 5 through 8.

At 1320, the UE may generate feedback associated with the downlink shared channel transmission based on monitoring for the downlink shared channel transmission. The operations of 1320 may be performed according to the methods described herein. In some examples, aspects of the operations of 1320 may be performed by a feedback component as described with reference to FIGS. 5 through 8.

At 1325, the UE may transmit the generated feedback based on the number of bits for feedback indicated by the uplink grant. The operations of 1325 may be performed according to the methods described herein. In some examples, aspects of the operations of 1325 may be performed by a feedback interface as described with reference to FIGS. 5 through 8.

Figure 14:
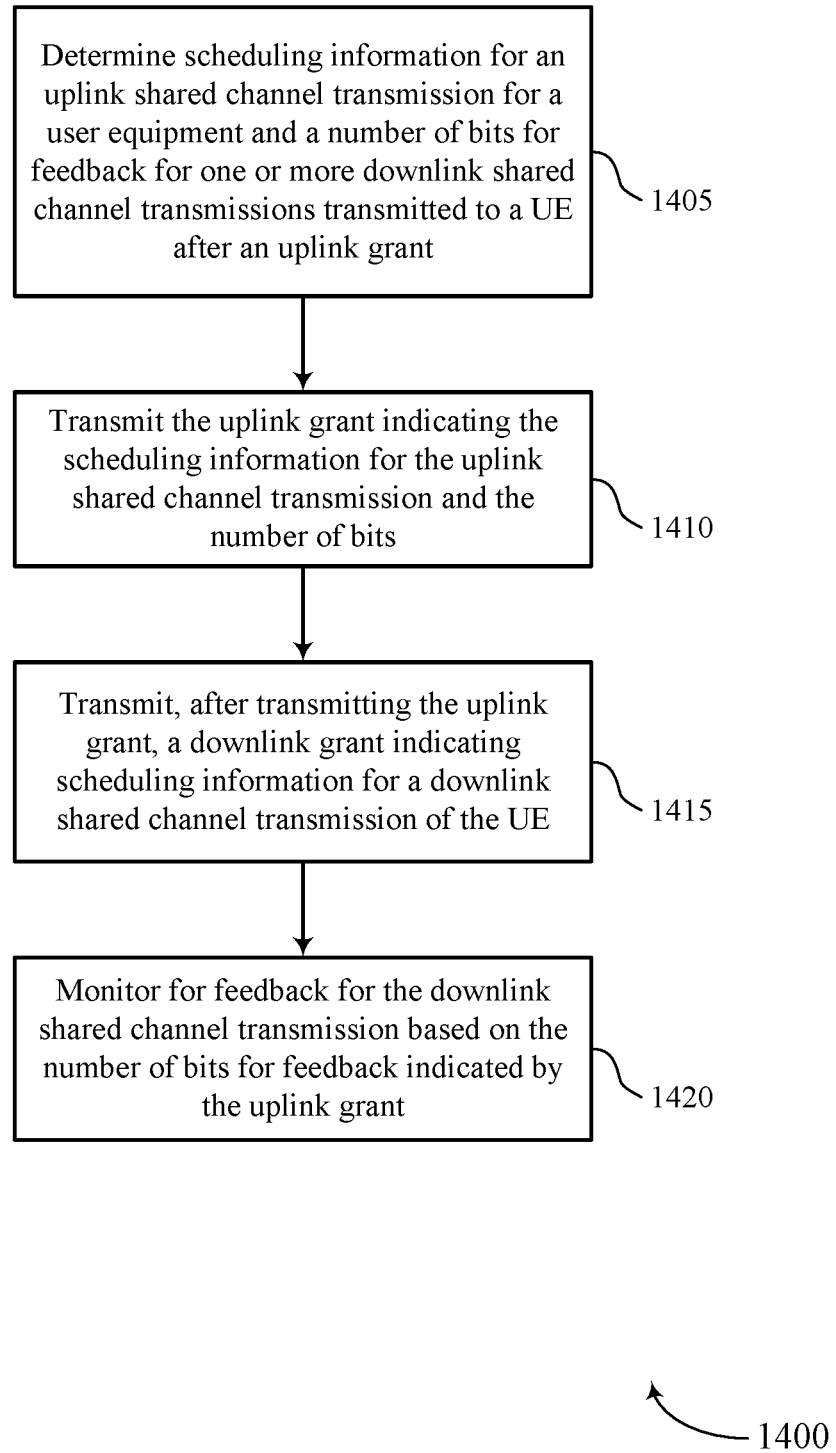

FIG. 14 shows a flowchart illustrating a method 1400 that supports feedback transmissions based on uplink grants in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may determine scheduling information for an uplink shared channel transmission for a user equipment and a number of bits for feedback for one or more downlink shared channel transmissions transmitted to a UE after an uplink grant. The operations of 1405 may be performed according to the methods described herein. In some examples, aspects of the operations of 1405 may be performed by a shared channel component as described with reference to FIGS. 9 through 12.

At 1410, the base station may transmit the uplink grant indicating the scheduling information for the uplink shared channel transmission and the number of bits. The operations of 1410 may be performed according to the methods described herein. In some examples, aspects of the operations of 1410 may be performed by an uplink grant component as described with reference to FIGS. 9 through 12.

At 1415, the base station may transmit, after transmitting the uplink grant, a downlink grant indicating scheduling information for a downlink shared channel transmission of the UE. The operations of 1415 may be performed according to the methods described herein. In some examples, aspects of the operations of 1415 may be performed by a downlink grant component as described with reference to FIGS. 9 through 12.

At 1420, the base station may monitor for feedback for the downlink shared channel transmission based on the number of bits for feedback indicated by the uplink grant. The operations of 1420 may be performed according to the methods described herein. In some examples, aspects of the operations of 1420 may be performed by a feedback component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving an uplink grant indicating scheduling information for an uplink shared channel transmission for the UE and indicating a number of bits for feedback for one or more downlink shared channel transmissions received after the uplink grant; receiving, after receiving the uplink grant, a downlink grant indicating scheduling information for a downlink shared channel transmission; monitoring for the downlink shared channel transmission based at least in part on the scheduling information for the downlink shared channel transmission; generating feedback associated with the downlink shared channel transmission based at least in part on monitoring for the downlink shared channel transmission; and transmitting the generated feedback based at least in part on the number of bits for feedback indicated by the uplink grant.

Aspect 2: The method of aspect 1, wherein receiving the uplink grant indicating the number of bits for feedback comprises: receiving a predicted number of bits for feedback.

Aspect 3: The method of any of aspects 1 through 2, further comprising: identifying a number of bits for transmitting the generated feedback for the downlink shared channel transmission, wherein the generated feedback is transmitted based at least in part on the identified number of bits.

Aspect 4: The method of aspect 3, further comprising: determining that the number of bits for transmitting the generated feedback is less than or equal to the number of bits indicated by the uplink grant, wherein the generated feedback is transmitted based at least in part on the determining.

Aspect 5: The method of aspect 4, further comprising: inserting one or more values in the generated feedback such that the number of bits for transmitting the generated feedback is equal to the number of bits indicated by the uplink grant based at least in part on determining that the number of bits for transmitting the generated feedback is less than the number of bits indicated by the uplink grant, wherein the generated feedback including the one or more values is transmitted based at least in part on the inserting.

Aspect 6: The method of any of aspects 4 through 5, wherein the generated feedback is multiplexed with the uplink shared channel transmission based at least in part on the scheduling information indicated by the uplink grant.

Aspect 7: The method of any of aspects 3 through 3, further comprising: determining that the number of bits for transmitting the generated feedback is greater than the number of bits indicated by the uplink grant, wherein the generated feedback is transmitted based at least in part on the determining.

Aspect 8: The method of aspect 7, further comprising: determining to transmit the generated feedback separate from the uplink shared channel transmission based at least in part on determining that the number of bits for transmitting the generated feedback is greater than the number of bits indicated by the uplink grant, wherein the generated feedback is transmitted separate from the uplink shared channel transmission.

Aspect 9: The method of any of aspects 1 through 8, further comprising: identifying a multiplexing flag in the downlink grant, wherein the generated feedback is transmitted based at least in part on a value of the multiplexing flag.

Aspect 10: The method of aspect 9, further comprising: multiplexing the generated feedback with the uplink shared channel transmission based at least in part on the value of the multiplexing flag.

Aspect 11: The method of aspect 9, further comprising: determining to transmit the generated feedback separate from the uplink shared channel transmission based at least in part on the value of the multiplexing flag.

Aspect 12: The method of any of aspects 9 through 11, further comprising: receiving, after receiving the uplink grant, a second downlink grant including the multiplexing flag, wherein the generated feedback is transmitted based at least in part on the value of the multiplexing flag of a later downlink grant of the downlink grant and the second downlink grant.

Aspect 13: The method of any of aspects 1 through 12, further comprising: determining whether to transmit the generated feedback in the uplink shared channel transmission or to transmit the generated feedback separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof, wherein the feedback is transmitted based at least in part on the determining.

Aspect 14: The method of aspect 13, further comprising: identifying whether a ratio of the number of feedback bits to the amount of resources corresponding to the physical uplink shared channel is greater than a threshold, wherein the generated feedback is transmitted in the uplink shared channel transmission or separate from the uplink shared channel transmission based at least in part on the ratio.

Aspect 15: The method of any of aspects 1 through 14, wherein the uplink grant indicates the number of bits using a field that also indicates a feedback codebook size corresponding to at least one downlink transmission transmitted before the uplink grant.

Aspect 16: The method of any of aspects 1 through 14, wherein the uplink grant indicates the number of bits using a first field, and the uplink grant includes a second field that indicates a feedback codebook size corresponding to at least one downlink transmission transmitted before the uplink grant.

Aspect 17: The method of any of aspects 1 through 16, wherein the generated feedback includes one or more values that indicate a decoding status corresponding to the downlink shared channel transmission.

Aspect 18: A method for wireless communications at a base station, comprising: determining scheduling information for an uplink shared channel transmission for a user equipment and a number of bits for feedback for one or more downlink shared channel transmissions transmitted to a UE after an uplink grant; transmitting the uplink grant indicating the scheduling information for the uplink shared channel transmission and the number of bits; transmitting, after transmitting the uplink grant, a downlink grant indicating scheduling information for a downlink shared channel transmission of the UE; and monitoring for feedback for the downlink shared channel transmission based at least in part on the number of bits for feedback indicated by the uplink grant.

Aspect 19: The method of aspect 18, wherein determining the number of bits for feedback for the one or more downlink shared channel transmissions transmitted to the UE after the uplink grant comprises: determining a predicted number of bits for feedback for the one or more downlink shared channel transmissions transmitted to the UE after the uplink grant.

Aspect 20: The method of any of aspects 18 through 19, further comprising: identifying a number of bits for transmission of the feedback by the UE for the downlink shared channel transmission.

Aspect 21: The method of aspect 20, further comprising: determining that the number of bits for transmission of the feedback by the UE is less than or equal to the number of bits indicated by the uplink grant; and receiving the feedback based at least in part on the determining.

Aspect 22: The method of aspect 21, wherein the feedback includes one or more values such that a number of bits for the feedback is equal to the number of bits indicated by the uplink grant.

Aspect 23: The method of any of aspects 21 through 22, wherein receiving the feedback comprises receiving the feedback in the uplink shared channel transmission.

Aspect 24: The method of aspect 20, further comprising: determining that the number of bits for transmitting the generated feedback is greater than the number of bits indicated by the uplink grant.

Aspect 25: The method of aspect 24, further comprising: receiving the feedback separate from the uplink shared channel transmission based at least in part on the determining.

Aspect 26: The method of any of aspects 18 through 25, further comprising: determining a value for a multiplexing flag for the downlink grant, wherein transmitting the downlink grant comprises transmitting the multiplexing flag with the value; and receiving the feedback for the downlink shared channel transmission based at least in part on the value of the multiplexing flag.

Aspect 27: The method of aspect 26, wherein receiving the feedback in the uplink shared channel transmission is based at least in part on the multiplexing flag.

Aspect 28: The method of aspect 26, wherein the feedback is received separate from the uplink shared channel transmission based at least in part on the value of the multiplexing flag.

Aspect 29: The method of any of aspects 26 through 28, further comprising: transmitting, after transmitting the uplink grant, a second downlink grant including the multiplexing flag, wherein receiving the feedback is based at least in part on the value of the multiplexing flag of a later downlink grant of the downlink grant and the second downlink grant.

Aspect 30: The method of any of aspects 18 through 29, further comprising: indicating, to the UE, to transmit the feedback in the uplink shared channel transmission or separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof; and receiving the feedback based at least in part on the indicating.

Aspect 31: The method of aspect 30, further comprising: identifying whether a ratio of the number of feedback bits to the amount of resources corresponding to the physical uplink shared channel is greater than a threshold, wherein the generated feedback is transmitted in the uplink shared channel transmission or separate from the uplink shared channel transmission based at least in part on the ratio.

Aspect 32: The method of any of aspects 18 through 31, further comprising: monitoring communication patterns of uplink communications, or downlink communications, or both with the UE, wherein the number of bits is determined based at least in part on the monitoring.

Aspect 33: The method of any of aspects 18 through 32, wherein the uplink grant indicates the number of bits using a field that also indicates a feedback codebook size corresponding to at least one downlink transmission transmitted before the uplink grant.

Aspect 34: The method of any of aspects 18 through 32, wherein the uplink grant indicates the number of bits using a first field, and the uplink grant includes a second field that indicates a feedback codebook size corresponding to at least one downlink transmission transmitted before the uplink grant.

Aspect 35: The method of any of aspects 18 through 34, wherein the generated feedback includes one or more values that indicate a decoding status corresponding to the downlink shared channel transmission.

Aspect 36: An apparatus for wireless communications at a UE, comprising: a processor; memory coupled with the processor; and instructions stored in the memory and executable by the processor to cause the apparatus to perform a method of any of aspects 1 through 17.

Aspect 37: An apparatus for wireless communications at a UE, comprising at least one means for performing a method of any of aspects 1 through 17.

Aspect 38: A non-transitory computer-readable medium storing code for wireless communications at a UE, the code comprising instructions executable by a processor to perform a method of any of aspects 1 through 17.

Aspect 39: An apparatus for wireless communications at a base station, comprising a processor; memory coupled with the processor; and instructions stored in the memory and executable by the processor to cause the apparatus to perform a method of any of aspects 18 through 35.

Aspect 40: An apparatus for wireless communications at a base station, comprising at least one means for performing a method of any of aspects 18 through 35.

Aspect 41: A non-transitory computer-readable medium storing code for wireless communications at a base station, the code comprising instructions executable by a processor to perform a method of any of aspects 18 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving an uplink grant indicating first scheduling information for an uplink shared channel transmission by the UE and indicating a number of bits for feedback for one or more downlink shared channel transmissions;
    receiving, after receiving the uplink grant, a downlink grant indicating second scheduling information for a downlink shared channel transmission of the one or more downlink shared channel transmissions, the downlink grant including a multiplexing flag associated with transmission of feedback for the downlink shared channel transmission in the uplink shared channel transmission scheduled by the uplink grant; and
    transmitting the feedback based at least in part on the number of bits and a value of the multiplexing flag.

2. The method of claim 1, further comprising:
    identifying a number of bits for transmitting the feedback, wherein the feedback is transmitted based at least in part on the identified number of bits.

3. The method of claim 2, further comprising:
    determining that the number of bits for transmitting the feedback is less than or equal to the number of bits indicated by the uplink grant, wherein the feedback is transmitted based at least in part on the determining.

4. The method of claim 3, further comprising:
    inserting one or more values in the feedback such that the number of bits for transmitting the feedback is equal to the number of bits indicated by the uplink grant based at least in part on determining that the number of bits for transmitting the feedback is less than the number of bits indicated by the uplink grant, wherein the feedback including the one or more values is transmitted based at least in part on the inserting.

5. The method of claim 3, wherein the feedback is multiplexed with the uplink shared channel transmission based at least in part on the first scheduling information indicated by the uplink grant.

6. The method of claim 2, further comprising:
    determining that the number of bits for transmitting the feedback is greater than the number of bits indicated by the uplink grant, wherein the feedback is transmitted based at least in part on the determining.

7. The method of claim 6, further comprising:
    determining to transmit the feedback separate from the uplink shared channel transmission based at least in part on determining that the number of bits for transmitting the feedback is greater than the number of bits indicated by the uplink grant, wherein the feedback is transmitted separate from the uplink shared channel transmission.

8. The method of claim 1, further comprising:
    identifying the multiplexing flag in the downlink grant.

9. The method of claim 1, further comprising:
multiplexing the feedback with the uplink shared channel transmission based at least in part on the value of the multiplexing flag.

10. The method of claim 1, further comprising:
determining to transmit the feedback separate from the uplink shared channel transmission based at least in part on the value of the multiplexing flag.

11. The method of claim 1, further comprising:
receiving, after receiving the uplink grant, a second downlink grant including a respective multiplexing flag, wherein the feedback is transmitted based at least in part on the value of the multiplexing flag or the respective multiplexing flag of a later downlink grant of the downlink grant and the second downlink grant.

12. The method of claim 1, further comprising:
determining whether to transmit the feedback in the uplink shared channel transmission or to transmit the feedback separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof, wherein the feedback is transmitted based at least in part on the determining.

13. The method of claim 12, further comprising:
identifying whether a ratio of the number of feedback bits to the amount of resources corresponding to the physical uplink shared channel is greater than a threshold, wherein the feedback is transmitted in the uplink shared channel transmission or separate from the uplink shared channel transmission based at least in part on the ratio relative to the threshold.

14. The method of claim 1, wherein the uplink grant indicates the number of bits using a field that also indicates a feedback codebook size corresponding to at least one downlink shared channel transmission of the one or more downlink shared channel transmissions that occur before the uplink grant.

15. The method of claim 1, wherein:
the uplink grant indicates the number of bits using a first field, and
the uplink grant includes a second field that indicates a feedback codebook size corresponding to at least one downlink shared channel transmission of the one or more downlink shared channel transmissions that occur before the uplink grant.

16. The method of claim 1, wherein the feedback include one or more values that indicate a decoding status corresponding to the one or more downlink shared channel transmissions.

17. A method for wireless communications at an access network entity, comprising:
determining first scheduling information for an uplink shared channel transmission by a user equipment (UE) and a number of bits for feedback for one or more downlink shared channel transmissions;
transmitting an uplink grant indicating the first scheduling information for the uplink shared channel transmission and the number of bits;
transmitting, after transmitting the uplink grant, a downlink grant indicating second scheduling information for a downlink shared channel transmission of the one or more downlink shared channel transmissions, the downlink grant including a multiplexing flag associated with transmission of feedback for the downlink shared channel transmission in the uplink shared channel transmission scheduled by the uplink grant; and
monitoring for feedback for the one or more downlink shared channel transmissions based at least in part on the number of bits and a value of the multiplexing flag.

18. The method of claim 17, further comprising:
identifying a number of bits for transmission of the feedback by the UE for the one or more downlink shared channel transmissions.

19. The method of claim 18, further comprising:
determining that the number of bits for transmission of the feedback by the UE is less than or equal to the number of bits indicated by the uplink grant; and
receiving the feedback based at least in part on the determining.

20. The method of claim 19, wherein the feedback includes one or more values such that a number of bits for the feedback is equal to the number of bits indicated by the uplink grant.

21. The method of claim 19, wherein receiving the feedback comprises receiving the feedback in the uplink shared channel transmission.

22. The method of claim 18, further comprising:
determining that the number of bits for transmitting the feedback is greater than the number of bits indicated by the uplink grant.

23. The method of claim 22, further comprising:
receiving the feedback separate from the uplink shared channel transmission based at least in part on the determining.

24. The method of claim 17, further comprising:
determining the value for the multiplexing flag for the downlink grant, wherein transmitting the downlink grant comprises transmitting the multiplexing flag with the value; and
receiving the feedback based at least in part on the value of the multiplexing flag.

25. The method of claim 17, wherein receiving the feedback in the uplink shared channel transmission is based at least in part on the multiplexing flag.

26. The method of claim 17, wherein the feedback is received separate from the uplink shared channel transmission based at least in part on the value of the multiplexing flag.

27. The method of claim 17, further comprising:
transmitting, after transmitting the uplink grant, a second downlink grant including a respective multiplexing flag, wherein receiving the feedback is received based at least in part on the value of the multiplexing flag or the respective multiplexing flag of a later downlink grant of the downlink grant and the second downlink grant.

28. The method of claim 17, further comprising:
indicating, to the UE, to transmit the feedback in the uplink shared channel transmission or separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof; and
receiving the feedback based at least in part on the indicating.

29. The method of claim 28, further comprising:
identifying whether a ratio of the number of feedback bits to the amount of resources corresponding to the physical uplink shared channel is greater than a threshold, wherein the feedback is received in the uplink shared channel transmission or separate from the uplink shared channel transmission based at least in part on the ratio relative to the threshold.

30. The method of claim 17, further comprising:
monitoring communication patterns of uplink communications, or downlink communications, or both with the UE, wherein the number of bits is determined based at least in part on the monitoring.

31. The method of claim 17, wherein the uplink grant indicates the number of bits using a field that also indicates a feedback codebook size corresponding to at least one downlink shared channel transmission of the one or more downlink shared channel transmissions that occur before the uplink grant.

32. The method of claim 17, wherein:
the uplink grant indicates the number of bits using a first field, and
the uplink grant includes a second field that indicates a feedback codebook size corresponding to at least one downlink shared channel transmission of the one or more downlink shared channel transmissions that occur before the uplink grant.

33. The method of claim 17, wherein the feedback includes one or more values that indicate a decoding status corresponding to the one or more downlink shared channel transmissions.

34. An apparatus for wireless communications at a user equipment (UE), comprising:
a processing system that includes processor circuitry and memory circuitry that stores code, the processing system configured to cause the UE to:
receive an uplink grant indicating first scheduling information for an uplink shared channel transmission by the UE, indicating a number of bits for feedback for one or more downlink shared channel transmissions;
receive, after receiving the uplink grant, a downlink grant indicating second scheduling information for a downlink shared channel transmission of the one or more downlink shared channel transmissions, the downlink grant including a multiplexing flag associated with transmission of feedback for the downlink shared channel transmission in the uplink shared channel transmission scheduled by the uplink grant; and
transmit the feedback based at least in part on the number of bits and a value of the multiplexing flag.

35. The apparatus of claim 34, wherein the processing system is further configured to cause the UE to:
identify a number of bits for transmitting the feedback, wherein the feedback is transmitted based at least in part on the identified number of bits.

36. The apparatus of claim 35, wherein the processing system is further configured to cause the UE to:
determine that the number of bits for transmitting the feedback is less than or equal to the number of bits indicated by the uplink grant, wherein the feedback is transmitted based at least in part on the determining.

37. The apparatus of claim 36, wherein the processing system is further configured to cause the UE to:
insert one or more values in the feedback such that the number of bits for transmitting the feedback are equal to the number of bits indicated by the uplink grant based at least in part on determining that the number of bits for transmitting the feedback is less than the number of bits indicated by the uplink grant, wherein the feedback including the one or more values is transmitted based at least in part on the inserting.

38. The apparatus of claim 36, wherein the feedback is multiplexed with the uplink shared channel transmission based at least in part on the first scheduling information indicated by the uplink grant.

39. The apparatus of claim 35, wherein the processing system is further configured to cause the UE to:
determine that the number of bits for transmitting the feedback is greater than the number of bits indicated by the uplink grant, wherein the feedback is transmitted based at least in part on the determining.

40. The apparatus of claim 39, wherein the processing system is further configured to cause the UE to:
determine to transmit feedback separate from the uplink shared channel transmission based at least in part on determining that the number of bits for transmitting the feedback is greater than the number of bits indicated by the uplink grant, wherein the feedback is transmitted separate from the uplink shared channel transmission.

41. The apparatus of claim 34, wherein the processing system is further configured to cause the UE to:
identify a multiplexing flag in the downlink grant.

42. The apparatus of claim 41, wherein the processing system is further configured to cause the UE to:
multiplex the feedback with the uplink shared channel transmission based at least in part on the value of the multiplexing flag.

43. The apparatus of claim 41, wherein the processing system is further configured to cause the UE to:
determine to transmit the feedback separate from the uplink shared channel transmission based at least in part on the value of the multiplexing flag.

44. The apparatus of claim 41, wherein the processing system is further configured to cause the UE to:
receive, after receiving the uplink grant, a second downlink grant including a respective multiplexing flag, wherein the feedback is transmitted based at least in part on the value of the multiplexing flag or the respective multiplexing flag of a later downlink grant of the downlink grant and the second downlink grant.

45. The apparatus of claim 34, wherein the processing system is further configured to cause the UE to:
determine whether to transmit the feedback in the uplink shared channel transmission or to transmit the feedback separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof, wherein the feedback is transmitted based at least in part on the determining.

46. The apparatus of claim 45, wherein the processing system is further configured to cause the UE to:
identify whether a ratio of the number of feedback bits to the amount of resources corresponding to the physical uplink shared channel is greater than a threshold, wherein the feedback is transmitted in the uplink shared channel transmission or separate from the uplink shared channel transmission based at least in part on the ratio relative to the threshold.

47. The apparatus of claim 34, wherein the uplink grant indicates the number of bits using a field that also indicates a feedback codebook size corresponding to at least one downlink shared channel transmissions of the one or more downlink shared channel transmissions that occur before the uplink grant.

48. The apparatus of claim 34, wherein:
the uplink grant indicates the number of bits using a first field, and
the uplink grant includes a second field that indicates a feedback codebook size corresponding to at least one downlink shared channel transmission of the one or more downlink shared channel transmissions that occur before the uplink grant.

49. An apparatus for wireless communications at an access network entity, comprising:
a processing system that includes processor circuitry and memory circuitry that stores code, the processing system configured to cause the access network entity to:
determine first scheduling information for an uplink shared channel transmission by a user equipment (UE) and a number of bits for feedback for one or more downlink shared channel transmissions;
transmit an uplink grant indicating the first scheduling information for the uplink shared channel transmission and the number of bits;
transmit, after transmitting the uplink grant, a downlink grant indicating second scheduling information for a downlink shared channel transmission of the one or more downlink shared channel transmissions, the downlink grant including a multiplexing flag associated with transmission of feedback for the downlink shared channel transmission in the uplink shared channel transmission scheduled by the uplink grant; and
monitor for feedback for the one or more downlink shared channel transmissions based at least in part on the number of bits and a value of the multiplexing flag.

50. The apparatus of claim 49, wherein the processing system is further configured to cause the access network entity to:
identify a number of bits for transmission of the feedback by the UE for the one or more downlink shared channel transmissions.

51. The apparatus of claim 50, wherein the processing system is further configured to cause the access network entity to:
determine that the number of bits for transmission of the feedback by the UE is less than or equal to the number of bits indicated by the uplink grant; and
receive the feedback based at least in part on the determining.

52. The apparatus of claim 51, wherein the feedback includes one or more values such that a number of bits for the feedback is equal to the number of bits indicated by the uplink grant.

53. The apparatus of claim 51, wherein the processing system is configured to cause the access network entity to receive the feedback in the uplink shared channel transmission.

54. The apparatus of claim 50, wherein the processing system is further configured to cause the access network entity to:
determine that the number of bits for transmitting the feedback is greater than the number of bits indicated by the uplink grant.

55. The apparatus of claim 54, wherein the processing system is further configured to cause the access network entity to:
receive the feedback separate from the uplink shared channel transmission based at least in part on the determining.

56. The apparatus of claim 49, wherein the processing system is further configured to cause the access network entity to:
determine the value for the multiplexing flag for the downlink grant, wherein, to transmit the downlink grant, the processing system is configured to cause the access network entity to transmit the multiplexing flag with the value; and
receive the feedback for the downlink shared channel transmission based at least in part on the value of the multiplexing flag.

57. The apparatus of claim 56, wherein receiving the feedback in the uplink shared channel transmission is based at least in part on the multiplexing flag.

58. The apparatus of claim 56, wherein the feedback is received separate from the uplink shared channel transmission based at least in part on the value of the multiplexing flag.

59. The apparatus of claim 56, wherein the processing system is further configured to cause the access network entity to:
transmit, after transmitting the uplink grant, a second downlink grant including a respective multiplexing flag, wherein receiving the feedback is based at least in part on the value of the multiplexing flag or the respective multiplexing flag of a later downlink grant of the downlink grant and the second downlink grant.

60. The apparatus of claim 49, wherein the processing system is further configured to cause the access network entity to:
indicate, to the UE, to transmit the feedback in the uplink shared channel transmission or separate from the uplink shared channel transmission based at least in part on a modulation and coding scheme corresponding to a physical uplink shared channel scheduled by the uplink grant, a number of feedback bits indicated by the downlink grant, an amount of resources corresponding to the physical uplink shared channel, or any combination thereof; and
receive the feedback based at least in part on the indicating.

61. The apparatus of claim 60, wherein the processing system is further configured to cause the access network entity to:
identify whether a ratio of the number of feedback bits to the amount of resources corresponding to the physical uplink shared channel is greater than a threshold, wherein the feedback is received in the uplink shared channel transmission or separate from the uplink shared channel transmission based at least in part on the ratio relative to the threshold.

62. The apparatus of claim 49, wherein the processing system is further configured to cause the access network entity to:
monitor communication patterns of uplink communications, or downlink communications, or both with the UE, wherein the first scheduling information is determined based at least in part on the monitoring.

63. The apparatus of claim 49, wherein the uplink grant indicates the number of bits using a field that also indicates a feedback codebook size corresponding to at least one downlink shared channel transmission of the one or more downlink shared channel transmissions that occur before the uplink grant.

64. The apparatus of claim 49, wherein:

the uplink grant indicates the number of bits using a first field, and the uplink grant includes a second field that indicates a feedback codebook size corresponding to at least one downlink shared channel transmission of the one or more downlink shared channel transmissions that occur before the uplink grant.

* * * * *